(12) United States Patent
Laliberté et al.

(10) Patent No.: US 8,739,360 B2
(45) Date of Patent: Jun. 3, 2014

(54) LID WITH A CURVED EDGE FOR USE WITH A LEAVES COLLECTION SYSTEM WITH A PORTABLE BLOWER/VACUUM ALLOWING THE REJECTION AND RETENTION OF DEBRIS IN A BAG

(76) Inventors: William Laliberté, Québec (CA); Denis Laliberté, Québec (CA)

( * ) Notice: Subject to any disclaimer, the term of this patent is extended or adjusted under 35 U.S.C. 154(b) by 129 days.

(21) Appl. No.: 13/555,147

(22) Filed: Jul. 21, 2012

(65) Prior Publication Data

US 2013/0180070 A1    Jul. 18, 2013

(30) Foreign Application Priority Data

Jan. 12, 2012   (CA) ...................................... 2764509

(51) Int. Cl.
*A47L 9/14*         (2006.01)
(52) U.S. Cl.
USPC ........................................... 15/347; 15/246.2

(58) Field of Classification Search
USPC ........... 15/347, 246, 246.2, 352, 374; 55/428, 55/429, 467
See application file for complete search history.

(56) References Cited

U.S. PATENT DOCUMENTS

| 6,170,118 B1 * | 1/2001 | McIntyre et al. ............ 15/327.6 |
| 6,574,829 B1 * | 6/2003 | Marcum et al. .................. 15/347 |
| 7,752,706 B2 * | 7/2010 | Goodger ...................... 15/327.4 |

* cited by examiner

*Primary Examiner* — Robert Scruggs

(57) ABSTRACT

A lid of round shape with curved edge having an anti-skid tape bonded between the curved edge and elevation made of felt, plastic or other materials glued to the side wall and three main openings, one for the entry of debris and two for allowing air out, as well as holes for attaching the various elements to the lid with cable ties. The lid with a curved edge is designed to be inserted into the opening of a bag to be held in place on the side edge of the lid with an elastic cord between the curved edge and the elevations. Ribbed connecting pipe connects the fan outlet of a vacuum at the lid and carries debris to the lid and the bag.

44 Claims, 20 Drawing Sheets

LID WITH A CURVED EDGE FOR USE WITH A LEAVES COLLECTION SYSTEM WITH A PORTABLE BLOWER/VACUUM ALLOWING THE REJECTION AND RETENTION OF DEBRIS IN A BAG

TECHNICAL FIELD

The present invention relates to a lid with a curved edge for use with a leaves collection system with a portable blower/vacuum in vacuum mode for the aspiration and the shredding of leaves and other lawn debris and the rejection of debris into a debris collection bag.

BACKGROUND OF THE INVENTION

The blower/vacuums are well known in lawn and garden implement which are used for blowing or picking up various debris, such as leaves and grass clippings. A typical blower/vacuum in suction mode comprises a housing that encloses an electric motor having a rotatable shaft on which is connected a fan placed in a housing. During the rotation of the motor, the fan mounted on the shaft rotates and creates a suction which draws the leaves and other lawn debris into the fan inlet where they are shredded and then ejected from the fan outlet. A handle is provided on the housing to allow the user to hold and direct the inlet of the blower/vacuum. In the mode normally used, the blower/vacuum rejects debris in a small collection bag coupled directly to the fan outlet of the blower/vacuum. The user wears on his shoulder the debris collection bag with a belt attached to the bag. The weight of the debris that accumulates in the bag creates in time some fatigue at the user. When the collection bag is full, the user disconnects the collection bag from the fan outlet of the blower/vacuum, unzips a zipper provided in the bag, and then dumps the debris out of the bags into a larger disposable bag to collect debris, a trash can or a place for decomposing debris. The user can then close the collection bag with the zipper, connects it to the blower/vacuum and continue to collect debris. This type of debris collection bag, although effective for collecting small amounts of debris, quickly becomes limiting for the collection of large amounts of debris. It must frequently be emptied what becomes tedious and slows significantly the work of the user. In addition to the weight of the bag and debris, the bag being suspended from the user's body, the dust emitted by the air output through the bag pores can be annoying to users.

Other debris collection systems were invented to correct problems of the conventional system described above. U.S. Pat. No. 7,506,403 B2 has a collection bag in a cart with wheels, the bag must be emptied when full and the system is designed for one type of bag. The user also has the disadvantage to pull a wagon wheel with the bag of debris. U.S. Pat. No. 7,587,785 B2, the user wears on his back the receptacle to collect the debris and debris must be emptied in a bag for disposal. For the U.S. Pat. No. 6,988,293 B2, leaves are collected directly in a bag with slots to the air outlet, the bag is disposable which eliminates the need to pour the debris and the bag is designed specifically for the system. The bag is attached to the blower/vacuum and the weight of the bag and debris is carried by the user. It is not possible to use a wide variety of bags to collect debris which limits the choice of supplier. The bag is of small dimensions compared to the collection bag for lawn debris. For U.S. Pat. No. 7,962,996 B1, U.S. Pat. No. 7,917,992 B2 and U.S. Pat. No. 7,752,706 B2, the debris is collected in a large collection bag inserted into a large solid container mounted on a cart. The cart can be moved and carries the weight of debris. This system is relatively heavy and large. It can be cumbersome to move over rough terrain. The user must move the cart as the work progresses. For U.S. Pat. No. 7,257,858 B2, U.S. Pat. No. 6,574,829 B1 and U.S. Pat. No. 4,713,858, the debris collection system is maintained by a support frame made of metal or a metal container. Debris is collected in a large bag. These systems are fixed and the leaves must be near the system to be collected. The user cannot easily move the system in use. For U.S. Pat. No. 7,341,612 B2, U.S. Pat. No. 7,185,389 B2 and U.S. Pat. No. 4,723,971, the debris is sucked into a small bag or into a rigid container without being shredded first requiring much more space for storage. In addition, the materials must be small as dust or sawdust, and it is little suitable for collection of whole leaves. The system moves on casters or wheels which can pose a problem when the ground is uneven. A single bag model can be used.

Accordingly, it is necessary in the art of collecting debris to have a debris collection system allowing both the user mobility and the collection of large amounts of debris without having to pour debris in another bag or requiring the user to carry the bag of debris. Similarly, it is also necessary to have a versatile system that can use a wide variety of bags sold by different companies for the collection of debris to reduce the cost of buying bags and therefore storage costs of debris.

In the art of debris collection, the debris is usually kept in bags placed in metal containers or plastic which is covered with a lid to prevent odors or protect them from weather. These lids are often round in shape and slightly curved. These lids are designed to be watertight and airtight for the needs they are intended. One of these types of lid has a groove on the side wall. U.S. Pat. No. 4,691,840, U.S. Pat. No. 5,163,577, U.S. Pat. No. 5,085,340, U.S. Pat. No. 5,160,060, U.S. Des. 326,342 and CA 2542229 refer to this type of lid. The company Rubbermaid Canada, Mississauga, Ontario, sells this type of container with lid for collecting debris. These lids do not have a top opening, which removes the possibility of inserting debris into containers or bags inside the containers other than removing the container lid.

Accordingly, as this type of lid round in shape and having both a groove on the side wall, openings for the air outlet and an opening for the discharge of lawn debris directly into a collecting bag using a blower/vacuum in suction mode, does not exist, Laliberté, W. and D. Laliberté, 2011, in the patent application CA 2,748,583, have invented a type of lid adapted to this need. They also presented the possible modifications to existing lids using their invention to allow their use with the collection system described in their patent application. For a good understanding of the present patent application and its usefulness, the authors recommend first checking the patent application CA 2,748,583 or U.S. Ser. No. 13/539,322.

The type of lid stated in the patent application CA 2,748,583 from Laliberté, W. and D. Laliberté, 2011, with a groove on the side to hold the bag up around the lid with a bungee cord, although very effective, application technique molding plastics is more expensive than the manufacturing technical plastic injection. Indeed, the presence of the groove on the side does not allow the use of the technique of injection molding, which is better suited for producing large quantities with the lowest costs per lid.

This is to reduce production costs inherent in this type of lid that a new type of lid without groove, but with a curved edge to the outside, was designed to be manufactured by plastic injection molding.

SUMMARY OF THE INVENTION

The new type of lid with curved edge to the outside is made of plastic and is designed for use with the debris collection system with a portable blower/vacuum for rejection and retention of debris in a bag described in patent application CA 2,748,583 or U.S. Ser. No. 13/539,322 from Laliberté, W. and D. Laliberté, 2011.

The lid is round in shape, preferably with a top flat to slightly domed. The lid has two openings on the top for the air outlet pipe with each outlet pipe molded perpendicular to the surface and an opening for the entry of debris, which is partly round with a U-shaped extension whose flared base is directed towards the center of the lid. This opening permits the insertion of two elbows of 45 degrees on either side of the lid and to give them an angle of inclination of about 10 degrees to the underside of the lid. In addition, the lid has on the top eighteen small holes for the attaching of two mesh strainers, a handle, a 45 degree elbow and a ribbed coupling pipe for the connection with the ribbed connecting pipe that brings the debris crushed from the blower/vacuum. The lid wall is inclined outwardly to facilitate the movement of debris toward the inside of the debris collection bag. The lid has a curved edge bent in a U-shape consisting of the side wall of the lid and the curvature of the extension of the latter bent towards the outside of the lid. Inside the U are, at regular intervals, side reinforcements to give more rigidity to the lid. At the lower limit of the rim is placed an anti-skid tape to increase the coefficient of friction between the lid wall and the debris collection bag to hold it in place around the lid when the elastic cord is placed on top of the bag at this location. The elastic cord is held in place on the side of the lid through the setting of four elevations near the edge of the anti-skid tape. These elevations are preferably greater than 5 mm in height and consist of either a thick felt, a piece of rubber or plastic with a sticker, a hook or screw. These elevations may also be formed by the deposition of several layers of hot melted glue. On top of the lid, two holes are made to install a handle formed by a tie or a rope.

The main advantage of the lid with a curved edge is that it can be produced in large quantities at lower cost than the type of lid with a groove on the side.

The lid with a curved edge has dimensions similar to one with a groove on the side and can replace it in the waste collection system described in patent application CA 2,748, 583 from Laliberté, W. and D. Laliberté, 2011.

The lid with a curved edge has the same efficiency for air circulation and retention of debris within the lid and the collection bag.

The lid with a curved edge retains the debris collection bag on its circumference as well as the lid with a groove.

The lid with a curved edge allows easy installation and easy release of the debris collection bag around its perimeter by installing and removing the bungee cord.

The lid with a curved edge has all the advantages of the lid with a groove on the side described in the debris collection system claimed in the patent application CA 2,748,583 from Laliberté, W. and D. Laliberté, 2011 or U.S. Ser. No. 13/539, 322. To read all these advantages, the reader is referred to the said patent application, which it would be too long to enumerate here.

BRIEF DESCRIPTION OF THE DRAWINGS

This invention will be described in more detail in the following description taken in conjunction with the following drawings, wherein like reference numbers indicate like elements throughout.

DETAILED DESCRIPTION OF THE PREFERRED EMBODIMENTS

Figure 1:
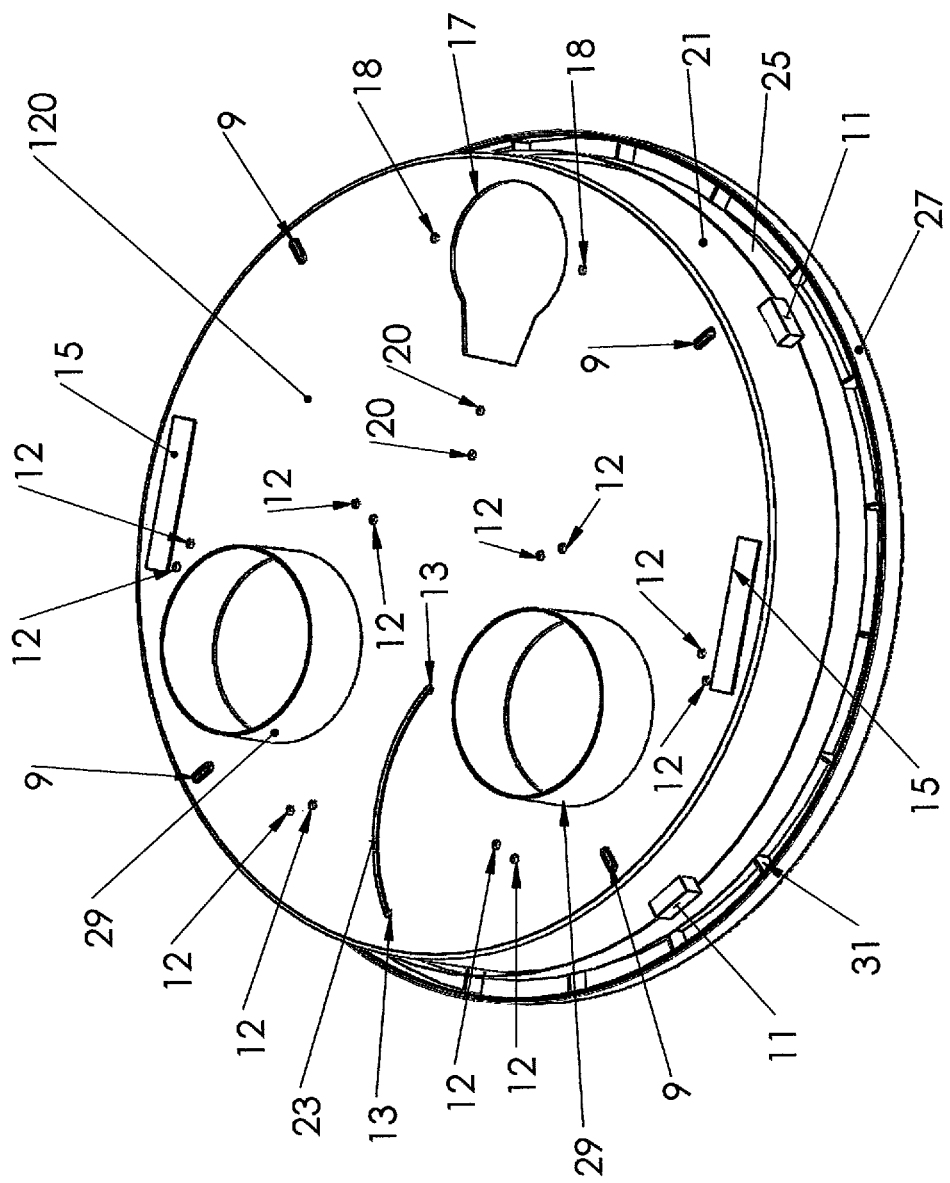
FIG. 1 is a perspective view of the top of the first preferred embodiment of the lid with curved edge.
Figure 13:
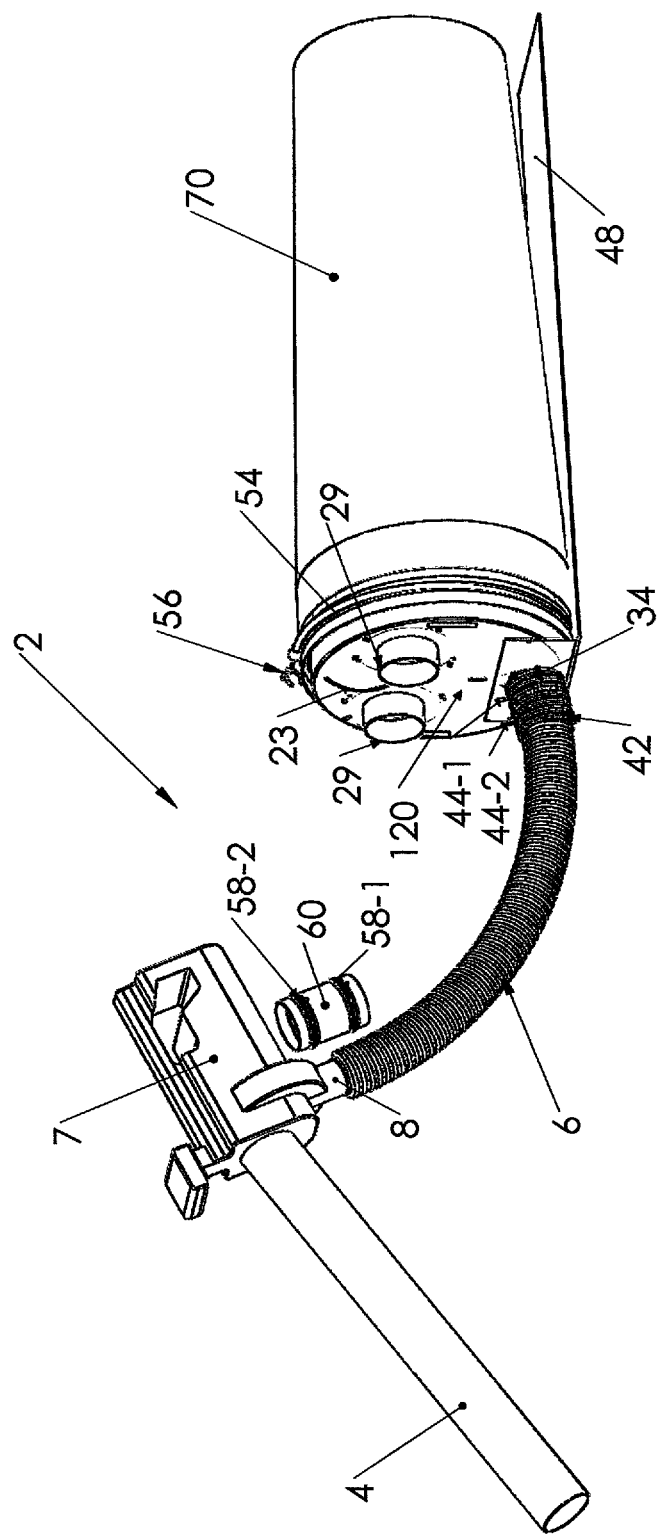
FIG. 13 is a perspective view of the lid with curved edge according to the first embodiment inserted into the debris collection system in its assembled form, which is connected to the output of a blower/vacuum.

FIG. 1 shows a perspective view of the top of the first preferred embodiment of the lid with curved edge of the present invention, including the lid with curved edge 120 of round shape with the side wall 21 and preferably a flat top. The wall 21 of the lid 120 is inclined a few degrees outwards in order to facilitate the movement of debris to the debris collection bag 70 (FIG. 13). The lid 120 has a curved edge 27 bent in a U-shape consisting of the side wall of the lid and the curvature of the extension of the latter bent towards the outside of the lid. Inside the U are at regular intervals lateral reinforcements 31 to give more rigidity to the lid 120. Also, at regular intervals, are arranged on the outer side wall 11 four elevations preferably rectangular in shape but can also be square or round. The elevations 11 are usually in felt or plastic but can be made of another material. The elevations 11 are positioned parallel to the curved edge 27 and are held in place by adhesive film beneath it. An anti-skid adhesive tape 25 approximately 2.5 cm wide situated immediately after the curved edge lids on 360 degrees outside the side wall of the lid 120. The anti-skid tape 25 will also increase the friction between the wall 21 of lid 120 and the debris collection bag 70 (FIG. 13) to hold it in place around the lid. On top of the lid, four small protrusions 9 indicate the position where the elevations must be placed on the outer wall 11 of the lid. Always on top of the lid 15 with two entries with the name WILDENLAL are printed near the edge of the lid in the central axis. Moreover, on top of the lid 120, two holes 13 are made to install a handle 23 formed by a cable tie, a rope, or a fixed handle. For simplicity, only the cable tie is shown for the handle 23. The handle 23 will be used to lift the entrance of the collection bag from time to time to move debris to the bottom of the collection bag 70 (FIG. 13). The lid 120 has two pipes on the top 29 for the air outlet. The pipes 29 are an integral part of the lid and are molded into the lid 120. The pipe 29 directs the air horizontally from the ground away from the face of the operator. The lid 120 also has on top an opening 17 near the edge to insert the elbow 30 (FIG. 3) for the entry of debris through the lid 120. The opening 17 is partially round shape with a U-shaped extension whose base is flared towards the center of the lid 120. The holes 12 twelve in number on the top of the lid 120 serve to hold with three fasteners 19 (FIGS. 3 and 4) each of the two strainers 41 (FIG. 4) without ear or by using three cable ties 38 (FIGS. 9 and 10) strainers 40 (FIG. 10) with three ears. It is also understood that the holes 12 can be used to insert other types of cable ties such as metal or plastic screws with washers and nuts to keep the strainers on the inside of the lid 120. It is also understood that the number of holes 12 used to maintain the strainers may be smaller than twelve according to the type of cable tie used. On top of the lid 120, two holes 20 were made to attach the elbow 32 (FIG. 4) onto the underside of lid 120 and guide outlet of the elbow 32 between the two strainers. The shape of the flared U-shaped portion of the opening 17 creates a space to take up and guide the outlet of the elbow 32 (FIGS. 4 and 5) to the underside of the lid with an angle of about 10 degrees. This angle ensures that debris crushed by the blower/vacuum 7 (FIG. 13) hits the rigid wall of the lid before being directed to the debris collection bag 70 (FIG. 13).

Figure 2:
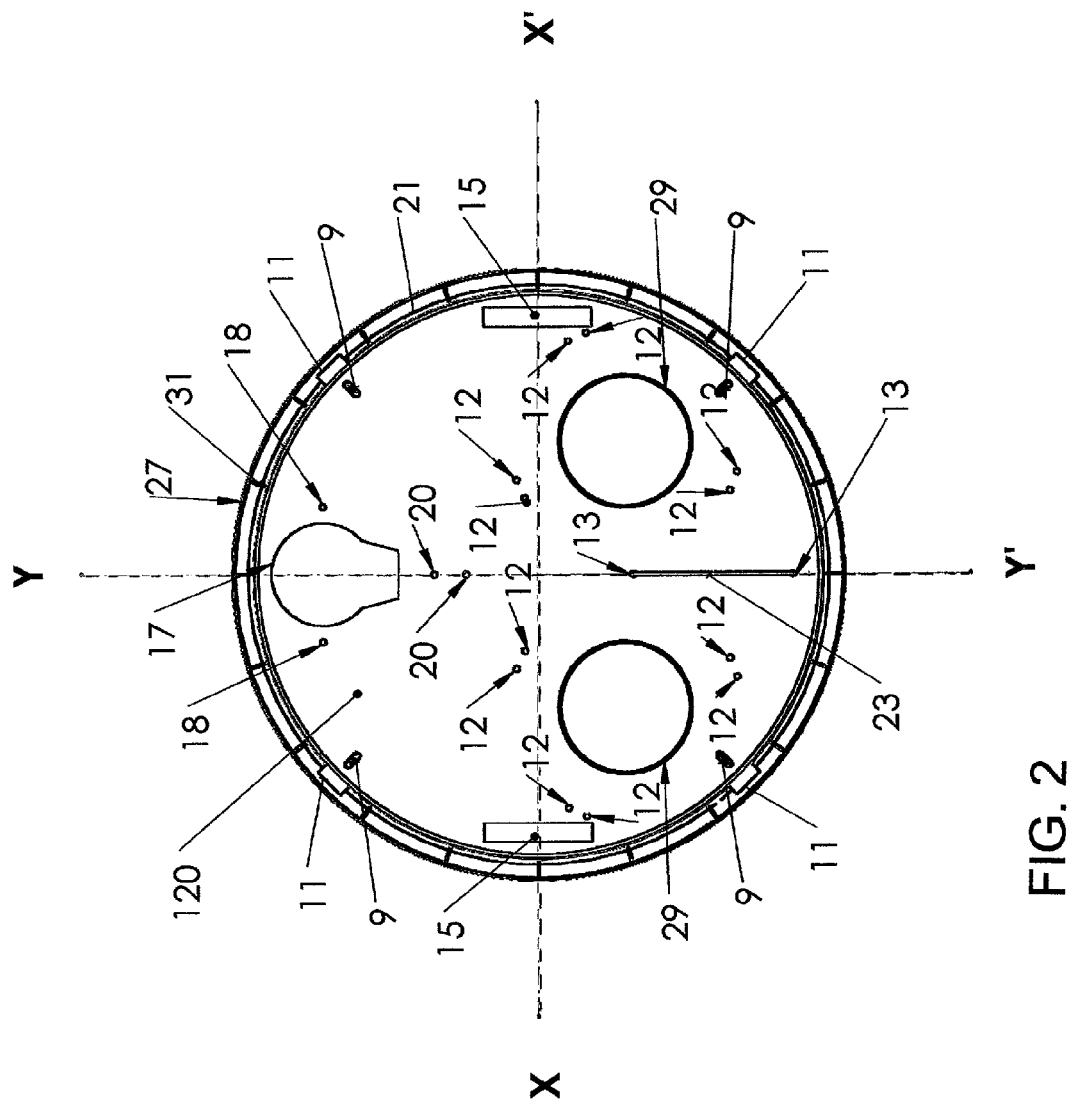
FIG. 2 is a top view of the first embodiment of the lid with curved edge.
Figure 10:
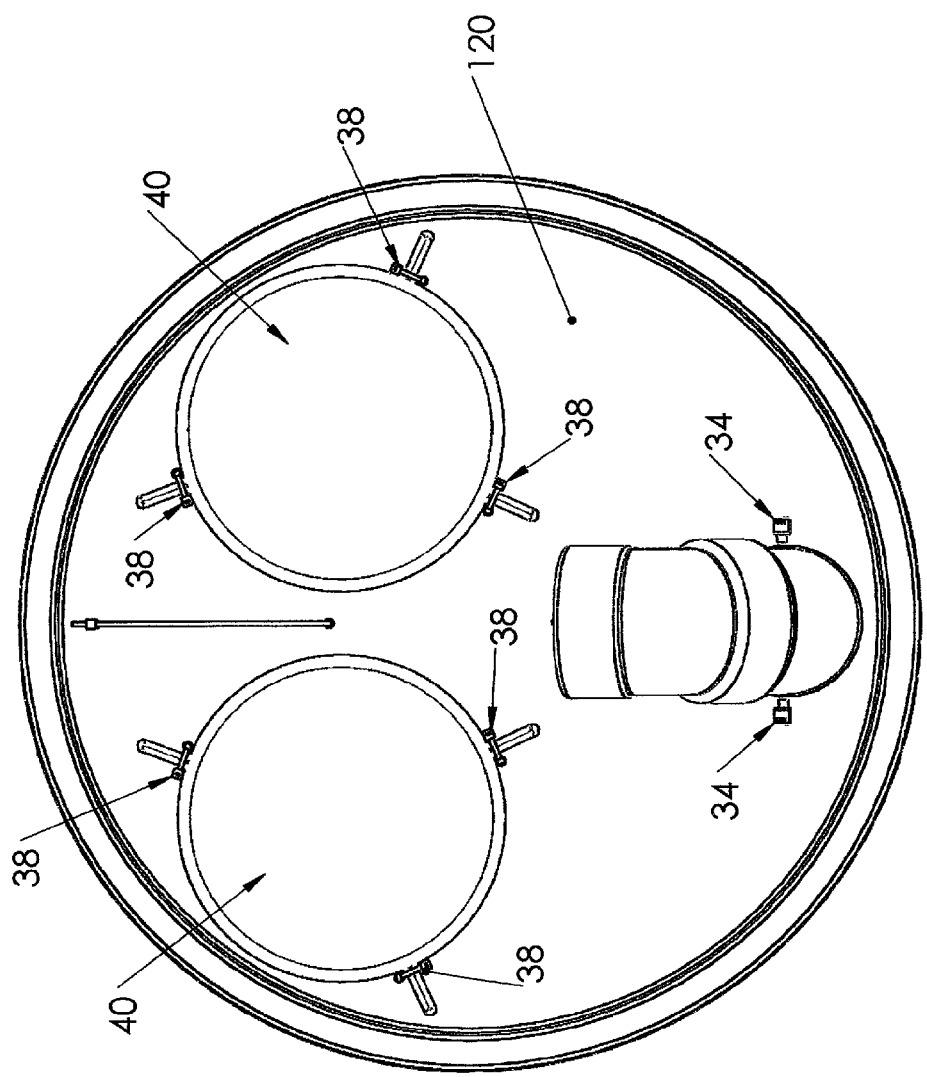
FIG. 10 is an underside view of the third embodiment of the lid with curved edge, showing in particular the method of attaching strainers with ears.

FIG. 2 is a top view of the first embodiment of the lid 120 showing the openings of the two pipes 29 located at equal distances from the axis XX' and YY' in quadrants XY' and X'Y'. Concentrically to the center of each of the two openings of pipes 29, there are six holes 12 in groups of two for a total of 12 holes 12 for the two openings. Distance from the center of holes 12 with the center of the openings of the pipes 29 is a few millimeters larger than the radius of strainers 41 or 40 (FIGS. 4 and 10). The strainers 41 and 40 located on the underside of the lid will be maintained by their edge with cable ties inserted in the holes 12. The distance between two holes 12 near one of the other allows the user to adapt attachment to the type of strainer used, either strainers without ears 41 or with ears 40. Depending on the method chosen to attach, the number of holes used will be three or six per strainer. Groups of two holes 12 (concentric to the pipes 29) form an isosceles triangle so that no cable tie is directly placed in the path of the debris. The arrangement described above is not limited to, other layouts of 12 holes around pipes 29 may be used to maintain the strainers 41 and 40. As regards to the two holes 20, they are used to attach the elbow 32 (FIG. 5) with a cable tie on the underside of the lid. These two holes are on the central axis passing through the center of the opening 17. The opening 17 has a round shape with an extension part U flared. The round part allows insertion of the male part of the elbow 30, but not that of the female part, which is larger. The elbow 30 is maintained by the shouldering of the female part. About the U flared extension, it allows the partial passage of the female part of the elbow 32 inserted into the male part of the elbow 30 on the underside of the lid. This U flared extension is essential in order to guide the output of the elbow 32 to the underside of the lid 120 and the direction of debris that enters through the elbows 30 and 32. Without the presence of this flared U, debris is projected in a straight line to the outlet of the elbow 32, which requires the addition of a protective wall on the opposite side to protect the debris collection bag 70 (FIG. 13). On the periphery of the lid 120, one can see the 360 degree curved edge 27 with U-shape and reinforcements 31 in the groove. The number of reinforcements shown here are 20, but it may be more or less according to desired stiffness of the lid 120. Attached to the sidewall 21 of the lid 120, the presence of four elevations 11 is to be noticed, rectangular in shape here, but could be square, round or other. The role of these elevations is to keep the elastic cord 54 (FIG. 13) around the lid 120. The four elevations are disposed preferably at an angle of 45 degrees with respect to the central axis YY' passing through the holes 20 and 13. It is understood that this layout is not limiting and that a number smaller or larger elevations can be used. The four protrusions 9 on top of the lid 120 indicate where it is best to place the elevation 11 on the wall of the lid 120. The two holes 13 are used to install a handle when they are connected by a cable tie, a rope, or a handle made of rigid material. The two holes 18 will be used to insert the two vertical fasteners 34 (FIG. 3) which will hold the ribbed pipe coupling 42 (FIGS. 12 and 13) to the lid 120. The ribbed coupling pipe 42 will bring together the lid 120 to the debris collection system 2 (FIG. 13). On each side of the lid are rectangular marks 15 to indicate the letters WILDENLAL.

Figure 3:
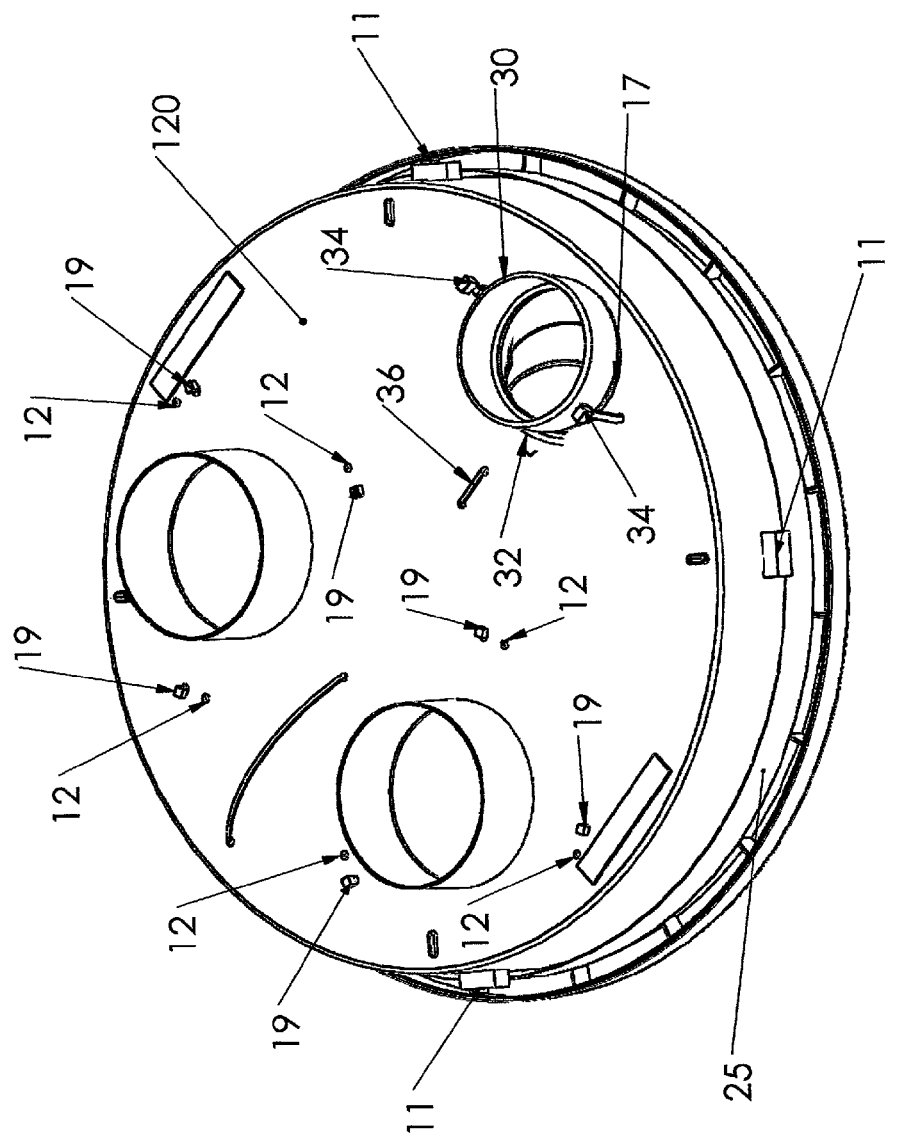
FIG. 3 is a perspective view of the top of the first embodiment of the lid with curved edge with the addition of cable ties to attach the different elements and elbows to the debris input.
Figure 4:
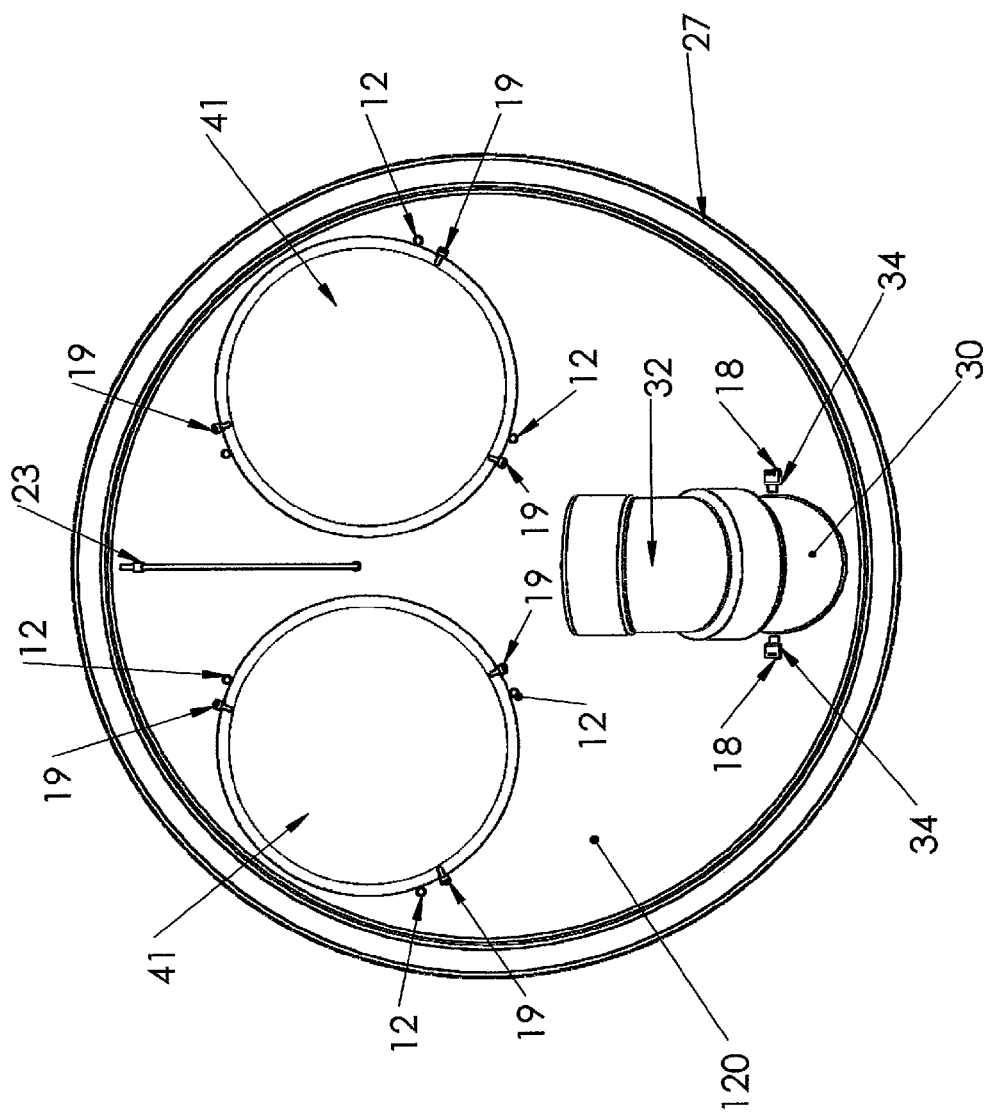
FIG. 4 is an underside view of the first embodiment of the lid with curved edge.

FIG. 3 is a perspective view of the top of the first preferred embodiment of the lid 120 with the head of the fasteners 19 and elbows 30 and 32 for the entry of debris. The head of six fasteners 19 in soft plastic is on top of the lid while their tail part was inserted into six holes 12 (FIGS. 1, 2 and 3) made in the lid 120. The head of fasteners 19 is made by the interlocking part of the cable tie, it having a dimension greater than the diameter of the hole 12. In this arrangement, only six holes 12 are used, the remaining six holes 12 are not used for cable ties, but are used to allow evacuation of air from the lid 120 and decrease the pressure inside the bag 70 (FIG. 13). FIG. 3 also shows the female part of the 45 degree elbow 30 and a section of the female part of the upper elbow 32 which have been inserted on either side of the lid 120 at the opening 17. A section of the female part of the elbow 32 exceeds the top of the lid 120 at the U-shaped part of the flared opening 17. This occurs when the male part of the elbow 32 (FIG. 5) is attached to the lid 120 with the cable tie 36. The outlet of the elbow 32 is then directed at an angle of about 10 degrees to the underside of the lid 120 so that the debris strikes first the rigid wall of the lid and then is diverted to the debris collection bag 70 (FIG. 13). The wall of the lid 120 absorbs the impact of debris and prevents it from perforating the wall of the debris collection bag 70 (FIG. 13). FIG. 3 also shows the two fasteners 34 which pass right through from the lid 120 and the position of which is vertical to the top of the lid 120. The fasteners 34 serve to attach the ribbed coupling pipe 42 (FIG. 12) to the lid 120. Three elevations 11 used to keep up the elastic cord 54 (FIG. 13) are also represented. The elevations 11 are positioned along the anti-skid tape 25.

Figure 12:
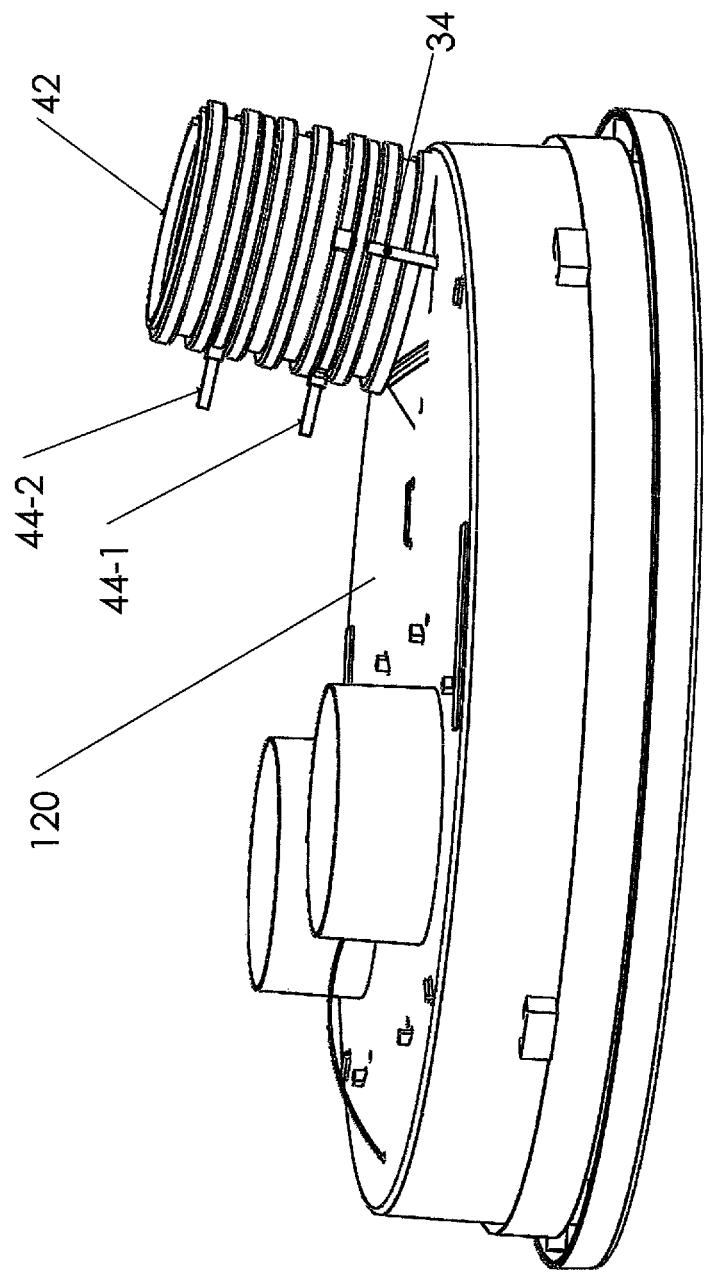
FIG. 12 is a side perspective view of the first embodiment with the ribbed coupling pipe and cable ties to attach the lid to the debris collection system.

FIG. 4 is an underside view of the first embodiment of the lid with curved edge. This view shows the elbow 30 inserted into the elbow 32 whose output is oriented both to the underside of the lid 120 and between the two strainers 41. The elbow 32 is attached to the underside of the lid 120 with the cable tie 36 (FIGS. 3 and 5) which passes right through the lid 120 while passing through the two holes 20 (FIGS. 1 and 2). The two strainers 41 cover the two openings for the release of air and are placed concentrically over the openings of pipes 29. The strainers 41 are used for filtration of the air that is leaving and for the retention of debris in the debris collection bag 70 (FIG. 13). Note that the strainers 41 have no ear on the periphery of the rigid part. In this arrangement, the strainers 41 are held to the lid 120 by three fasteners 19 whose arrangement allows it to retain the strainers 41 by their rigid edge. The head of the fasteners 19 (which is made by the interlocking part of a cable tie) (FIGS. 3 and 5) serves as an anchor on the top of the lid 120 while the other part, the tail part, which is inside the lid 120, is inserted in the interlocking part of another similar cable tie near the rigid edge of the strainers 41. The surplus of tail parts of the two cable ties are cut, leaving only part that will cover the edge of strainers 41. The fasteners 34 are constructed in the same way as the fasteners 19, but which will be the parts on the underside of the lid 120 which will serve as an anchor at holes 18 while the head of the cable tie will be tight to retain the ribbed pipe 42 (FIG. 12). FIG. 4 also shows the parts below the handle 23 represented here by a flexible cable tie. It should be noted that the elevations 11 (FIGS. 1, 2 and 3) do not appear in FIG. 4 because they are hidden by the curved edge 27.

Figure 5:
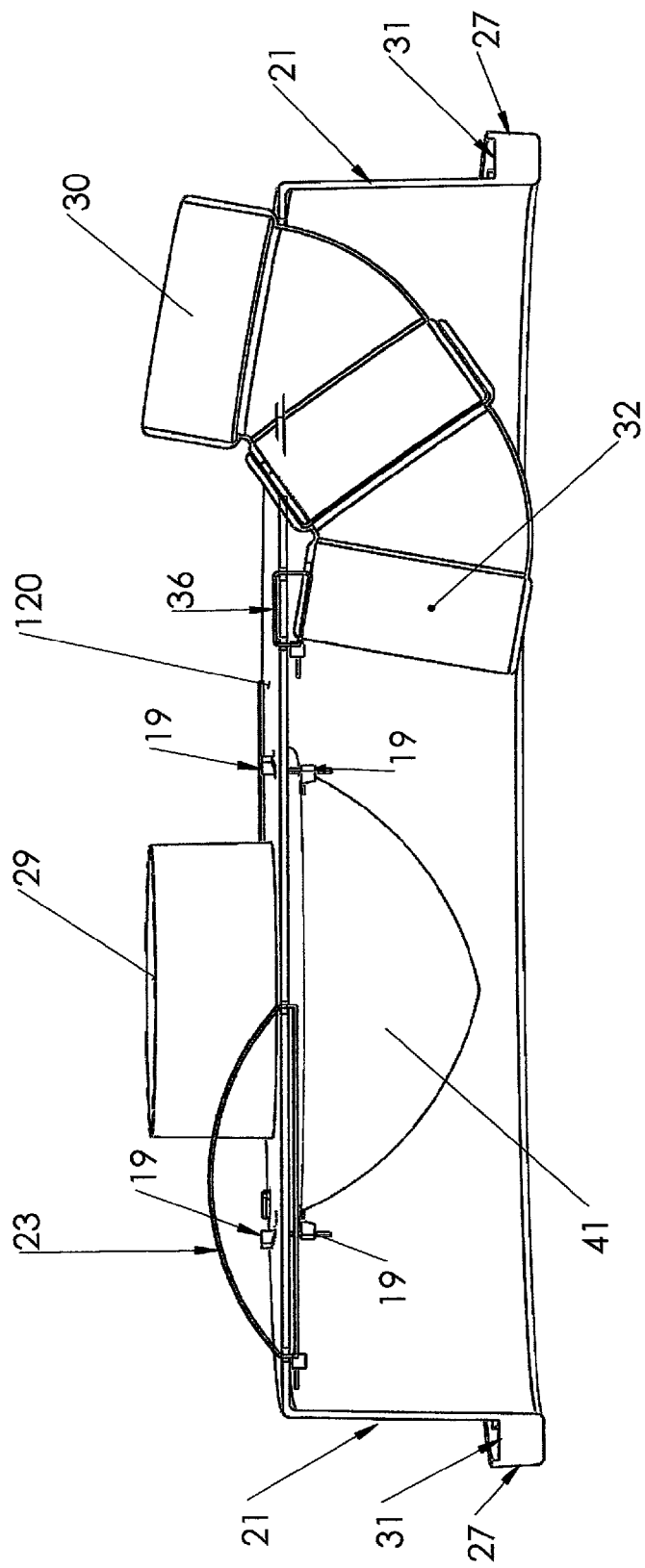
FIG. 5 is a cross section along the axis YY' passing through holes 13 and 20 of the first embodiment of the lid with curved edge.

FIG. 5 is a cross section along the axis YY' passing through holes 13 and 20 of the first embodiment of the lid with curved edge. One can see the insertion in the other one of the 45 degree elbows 30 and 32 so as to form an angle of 90 degrees. The male part of the elbow 30 is inserted into the female part of the elbow 32. The cable tie 36 is used to attach the male end of elbow 32 to the underside of the lid 120. To attach the elbow 32 to lid 120, the cable tie 36 passes both through the two holes 20 (FIGS. 1 and 2) in the lid 120 and a hole in the male part of the elbow 32 to about 2.5 cm the male end. This hole in the elbow 32 is in the section that will be in contact with the underside of lid 120 and on the central axis of 90 degrees formed by the elbows 30 and 32 assembled. The cable tie 36 allows up to about 10 degrees the outlet of the elbow 32 to the underside of the lid 120 and to direct the debris to the underside of the lid 120 and inside the wall 21 which is opposite the elbow 32. The wall 21 has the role of absorbing the shock of debris and diverting it to the inside of the bag 70 (FIG. 13) so as to protect it. Debris and air are directed between the two strainers 41 to protect them from the shock of falling debris and it only lets the air out through the two strainers 41 and the two pipes 29. The handle 23 is shown with its oval portion on the top and flattened on the underside of the lid 120. Two fasteners 19 are represented in the position to hold a strainer 41. A third fastener 19 is not apparent in FIG. 5. The sectional view shows the U-shape of the curved edge 27 (curved toward the outside of the lid 120) with two reinforcements 31 visible. The number of reinforcements 31 preferred is 20, but this number may be smaller or larger depending on the type of plastic used and the desired stiffness of the lid 120. It should be noted that the curved edge 27 is at the bottom of the wall 21.

Figure 6:
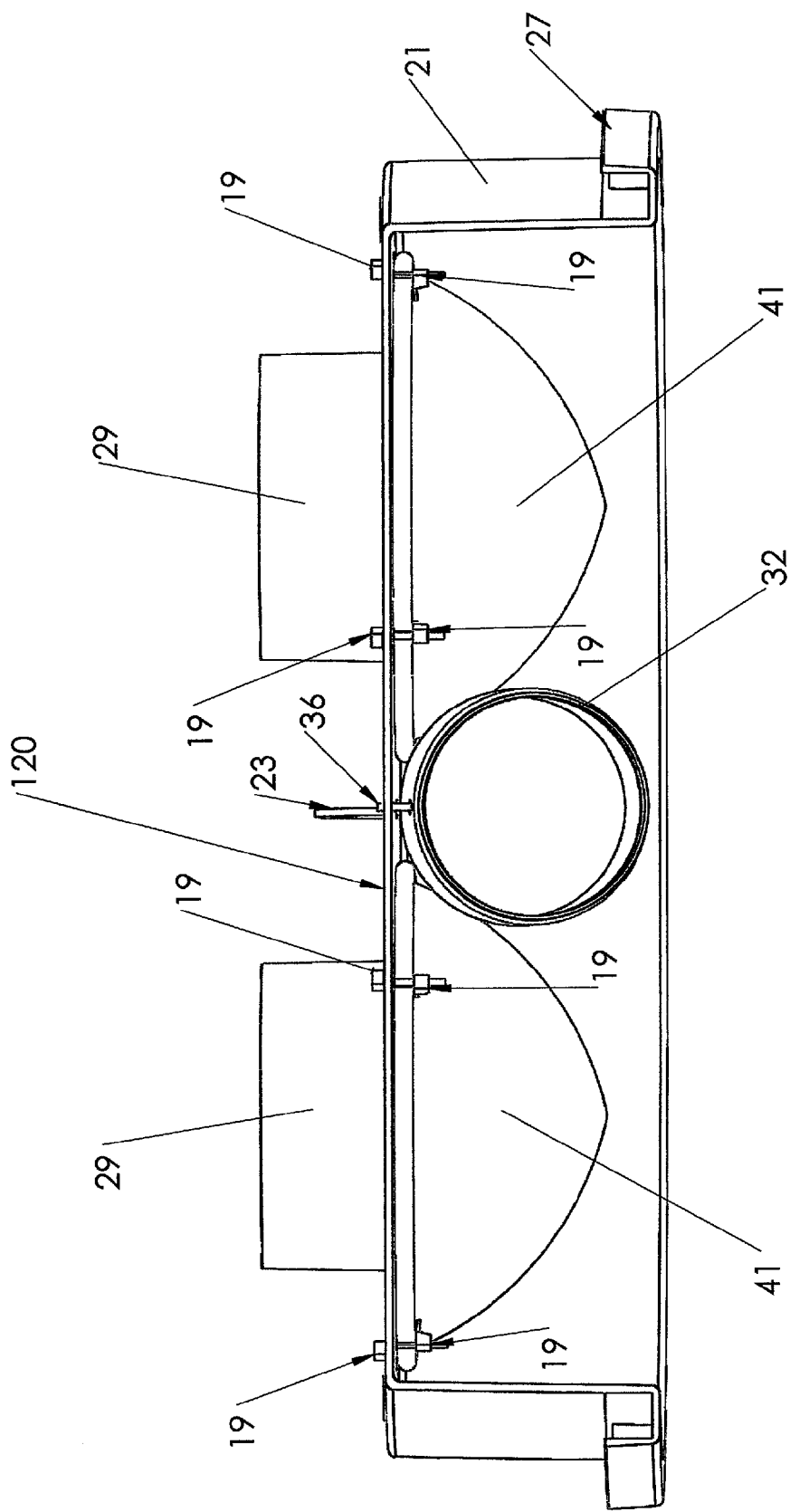
FIG. 6 is a cross section along the axis perpendicular to the axis YY' passing through holes 13 and 20 of the first embodiment of the lid with curved edge.

FIG. 6 is a cross section along the axis perpendicular to the axis YY' passing through holes 13 and 20 of the first embodiment of the lid with curved edge. In this representation, we see the two strainers 41 on either side of the male part of the elbow 32 by which arrives debris in the lid 120. The cable tie 36 holds the elbow 32 and the cable tie forms the handle 23 as well as the wall 21 and the curved edge 27, which are shown from a different angle from FIG. 5. On top of the lid 120, the two pipes 29 allow the air out, which is injected at the same time as the debris are also represented. FIG. 6 also shows four fasteners 19 inserted through the holes 12 (FIGS. 1 and 2), which cross at right angles on top of the lid 120. The head of the fastener 19 on the top of the lid 120 retains the portion of the fastener below it, which rests on the rigid rim of the strainer 41 so as to hold the strainers 41 on the underside of the lid 120. To hold both strainers 41 to the lid 120, a minimum of six fasteners 19 are necessary. As the fasteners 19 are held to lid 120 through the holes 12 (FIGS. 1 and 2) and there are twelve holes 12, a maximum of twelve fasteners 19 could be used to hold the strainers 41. It should be noted that the fasteners 19 can also be used to hold the strainers 40 with ears (FIG. 10).

Figure 7:
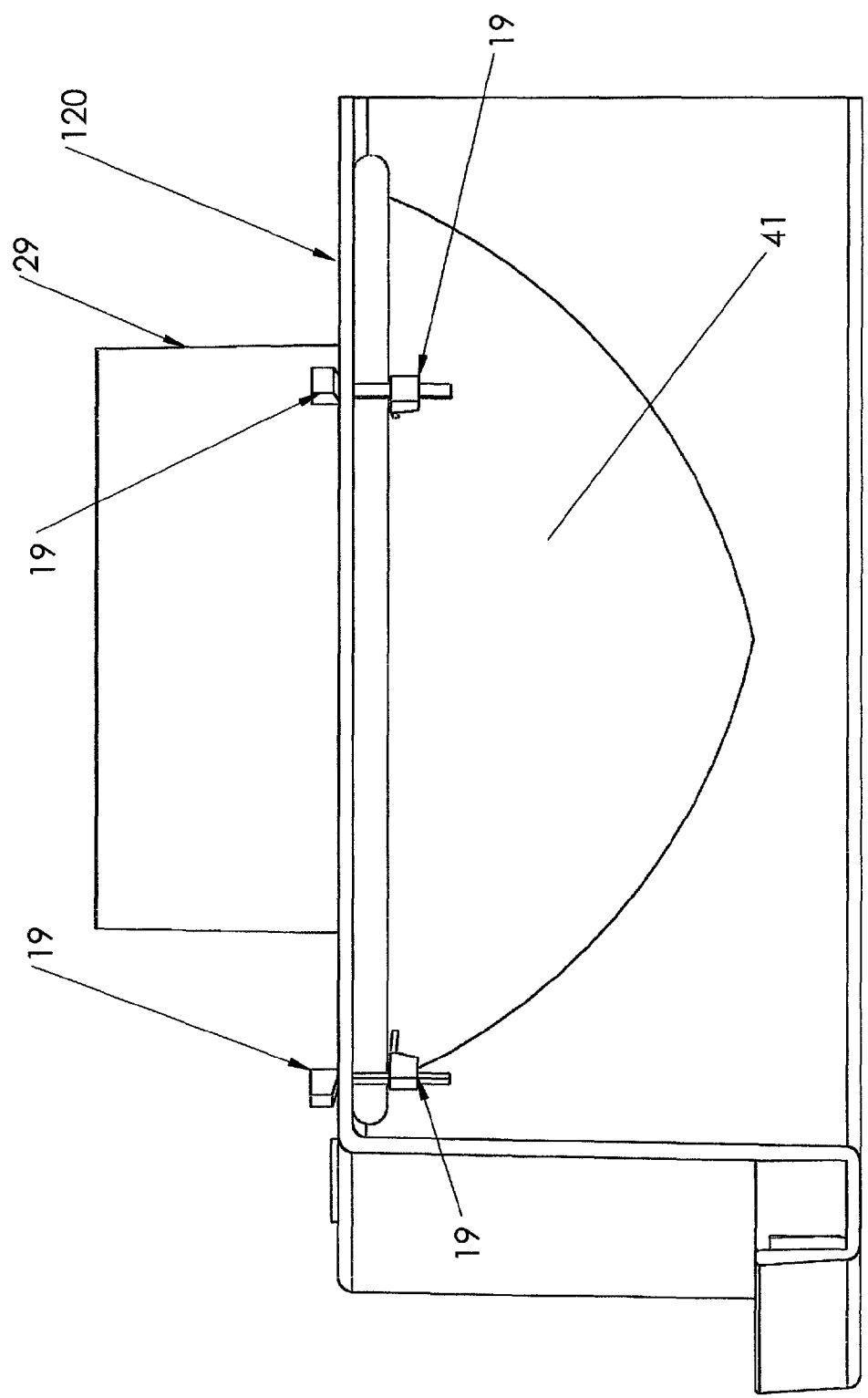
FIG. 7 is a detailed view of cable ties to attach the strainers without the ears.

FIG. 7 is a detailed view of fasteners 19 for holding the strainers 41 without ears. As mentioned earlier, the fasteners 19 can also be used to hold in the same way the strainers 40 (FIG. 10) with ears. The fasteners 19 are made of two parts of similar flexible plastic cable ties. The head of the main cable tie is on top of the lid 120 while its tail part passes through the lid 120 and is inserted into the head of a second cable tie near the rigid edge of the strainer 41. It's the filamentary part of the second cable tie that is on the rigid edge of the strainer 41 represented here. In FIG. 7, it is also shown on the top of the lid 120, one of the two pipes 29 for allowing the air out. The pipes 29 are used to direct the air leaving the lid 120 parallel to the ground and away from the face of the operator.

Figure 8:
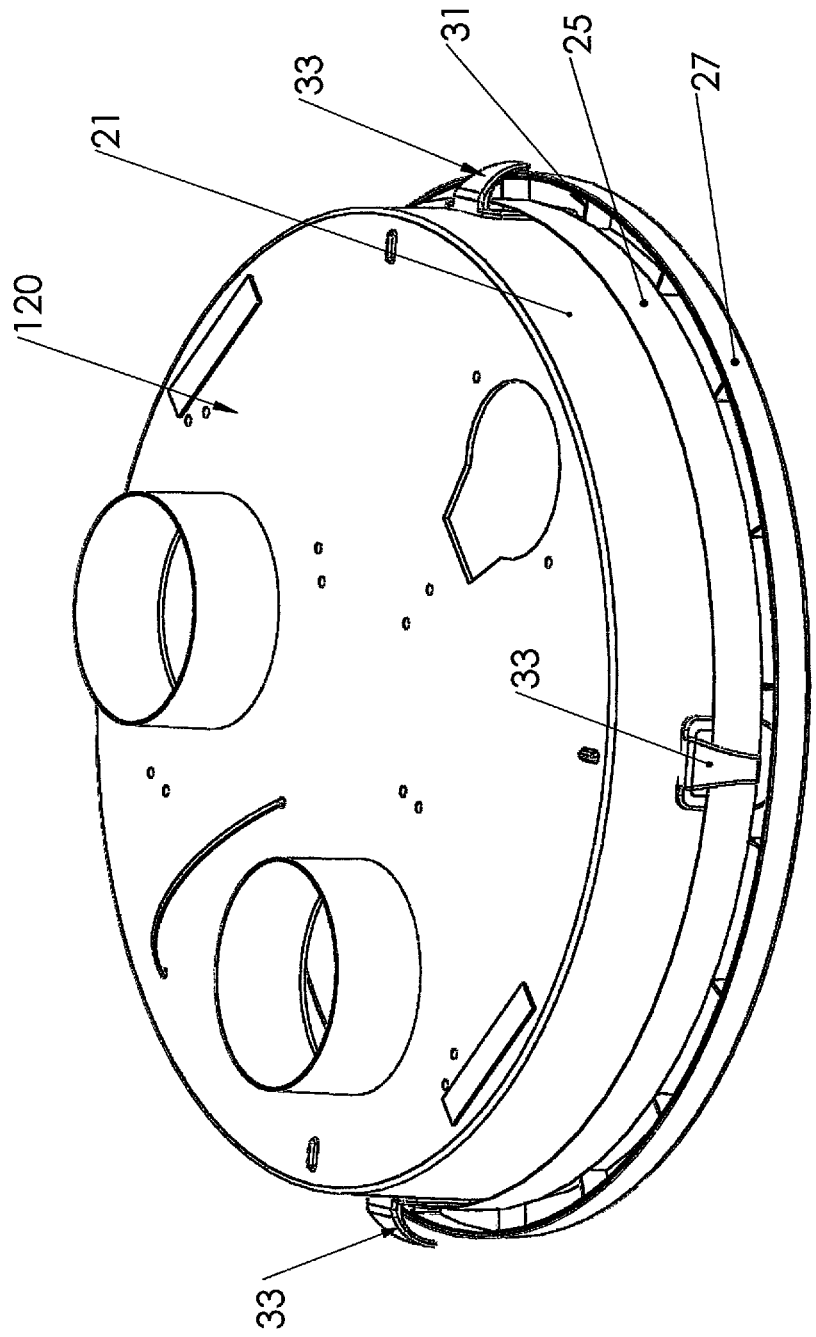
FIG. 8 is a perspective view of the second embodiment of the lid with curved edge with the presence of hooks on the wall.

FIG. 8 is a perspective view of the second embodiment of the lid 120 with curved edge with the presence of four utility hooks 33 on the outside of the wall 21. In this mode, four plastic hooks are glued to the wall 21 of the lid 120 and are arranged at the same locations as the elevations 11 (FIGS. 1, 2 and 3). However, a part of the base of the hooks 33 is inserted under the curved edge 27 between two reinforcements 31 in the U and they are placed perpendicular to the curved edge so as to leave a space between the end of the hook 33 and the curved edge 27. This is to allow insertion of the elastic cord 54 (FIG. 13) which serves to keep in place the debris collection bag 70 (FIG. 13). An adhesive anti-skid tape 25 covers the flat top of the hooks 33 glued to the wall 21 of the lid 120 and the tape actually goes a full 360 degrees around the basin. The anti-skid tape 25 helps to maintain the hooks 33 in place and also helps to increase the coefficient of friction between the wall 21 of the lid 120 and the debris collection bag 70 (FIG. 13) when the elastic cord 54 (FIG. 13) rests on the debris collection bag 70.

Figure 9:
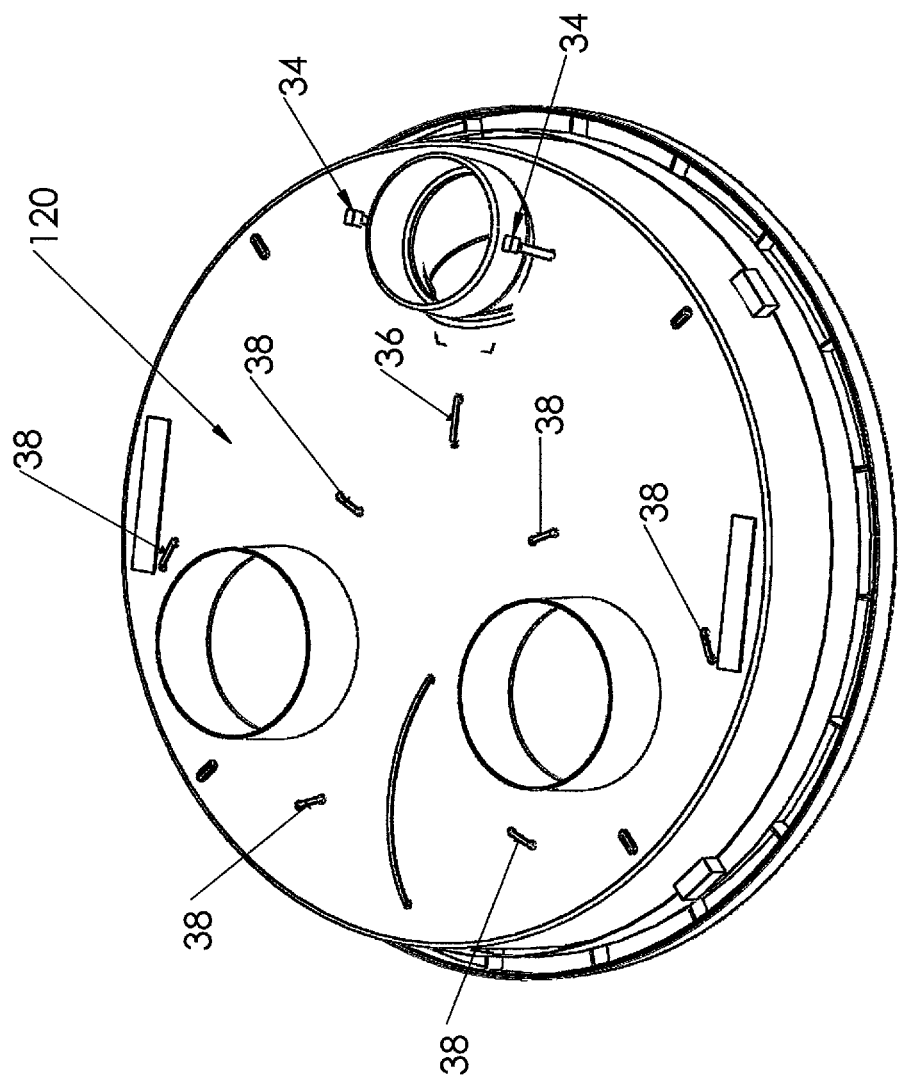
FIG. 9 is a perspective view of the top of the third embodiment of the lid with curved edge showing in particular the cable ties for strainers with ears.

FIGS. 9 and 10 are respectively a perspective view of the top and the underside of the third embodiment of the lid 120 with curved edge, showing in particular the cable tie 38 for the strainers 40 with ears (FIG. 10). On top of the lid 120 (FIG. 9), only the tail part of the cable tie 38 is apparent. In this embodiment, three cable ties 38 and six holes 12 (FIGS. 1 and 2) are used by strainer 40 to attach them to the underside of the lid 120. Each strainer 40 is held by the three ears on the rigid edge (FIG. 10). Each ear of the strainers 40 is surrounded by a flexible plastic cable tie which passes both over the ear and the two holes 12 (FIGS. 1 and 2) located on either side of each ear of the strainers 40 and by the top and the underside of lid 120. The cable tie 38 is closed on the underside of the lid 120 over the ear (FIG. 10). In FIG. 9, the cable tie 36 is also shown with its elongated part which passes right through from the lid 120 through the two holes 20 (FIGS. 1 and 2) and which attaches the male part of the elbow 32 (FIG. 5) passing through a hole in that part of the elbow. The cable tie 36 is closed on the underside of the lid 120 (FIG. 5). Also shown are the upper parts of two fasteners 34 (FIG. 9) which serve to hold the ribbed coupling pipe 42 (FIG. 12) to the lid 120 and the parts of fasteners 34 on the underside of the lid 120 (FIG. 10) holds the two fasteners to the lid 120.

Figure 11:
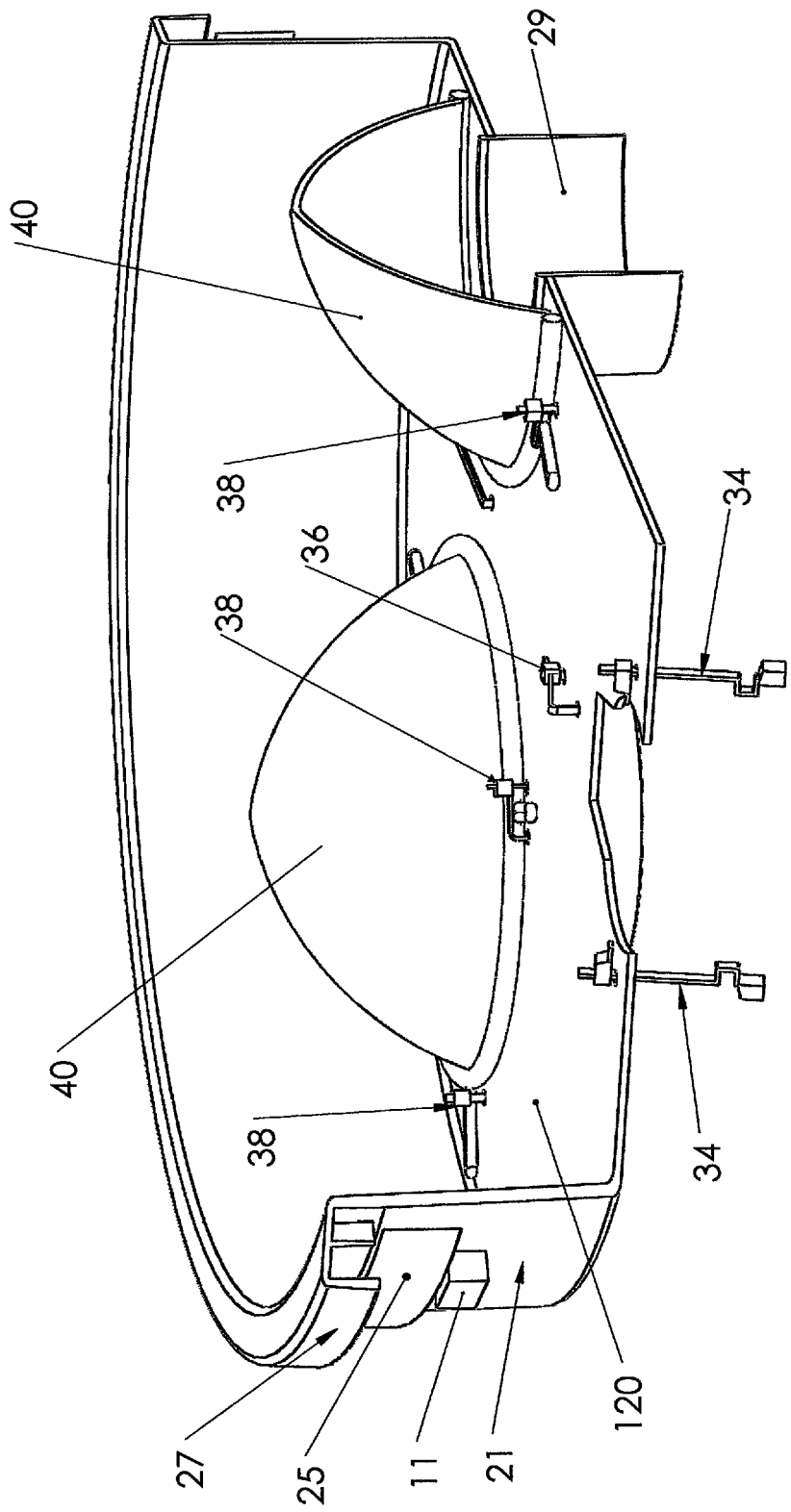
FIG. 11 is a sectional view of the underside of the third embodiment showing in particular the method of attaching strainers with ears of FIG. 10.

FIG. 11 is a sectional view of the underside of the lid 120 of the third embodiment showing in particular the method of attaching strainers 40 with ears to the lid 120. In FIG. 11, only three cable ties 38 are visible whereas they are six in number to attach the two strainers 40. Note that the cable ties 38 encircle both the ears of the strainers 40 and the lid 120 in passing through the two holes 12 (FIGS. 1 and 2) on each side of the ears. The closure of the cable tie is on the underside of the lid for cosmetic reasons only; the closure of the cable tie could also be on top without changing the design. The method using the cable ties 38 allows one to attach securely the strainers 40 to the lid 120 and thus preventing debris from penetrating through the underside of the strainer 40 and being discharged through the air outlets. FIG. 11 also shows in detail the design of the fasteners 34 and their arrangement relative to the lid 120. The biggest part of the main cable tie exceeds the top of the lid 120 while the tip of its elongated part on the underside of lid 120 is inserted into the head (the interlocking part) of a similar second cable tie, the latter is in contact with the underside of lid 120. The excess of tail parts of two cable ties were cut to be adjusted to the desired length. The parts of the fasteners 34 which sticks out on top of the lid is shown bent near the head of the fastener for the shape that they will adopt when they are tightened up against the ribbed coupling pipe 42 by the cable tie 44-1 (FIG. 12). In their natural form, these flexible plastic cable ties are straight. Note that the head of the fastener 34 which is on top of the lid 120 is directed outwards to prevent slippage of the fastener 34 against the cable tie 44-1. FIG. 11 shows also the cable tie 36 in the position it adopts when it retains the elbow 32 (FIGS. 4 and 5) on the underside of the lid 120. A sectional view of one of the strainers 40 is also visible, showing its shape and concentric arrangement relative to the air outlet pipe 29. It should be noted that the strainers 41 (FIGS. 4, 5, 6 and 7) have the same shape as the strainers 40 except for the rigid edge, which has three ears in the case of strainers 40. FIG. 11 also shows the shape of the curved edge 27 and its position relative to the anti-skid tape 25 and one of the four elevations 11 on the outer wall 21 of the lid 120.

FIG. 12 is a side perspective view of the first embodiment of the lid 120 with curved edge, the plastic ribbed coupling pipe 42 and the fasteners 34, 44-1, 44-2 to connect the lid 120 to the debris collection system 2 (FIG. 13). The ribbed coupling pipe 42 is split along its length to allow the insertion of the female part of the elbow 30 into it (FIGS. 3, 5, 9 and 12) not visible in FIG. 12. When the elbow 30 is inserted into the ribbed coupling pipe 42, the cable tie 44-1 is placed just below the head of the two fasteners 34 and is clamped firmly against the ribbed coupling pipe 42. The tightness distorts the fasteners 34 so that it matches the shape of the groove of ribbed coupling pipe 42. Once the cable tie 44-1 is tightened, the head of the fastener 34 holds the ribbed coupling pipe 42 to the lid 120. The cable tie 44-2 shown in FIG. 12 surrounds part of the ribbed coupling pipe 42 which will be placed over one end of the ribbed connecting pipe 6 (FIG. 13). The other end of the ribbed connecting pipe 6 is connected to the fan outlet 8 of the blower/vacuum 7 (FIG. 13). The ribbed coupling pipe 42 and the ribbed connecting pipe 6 have the same shape and same size so that the grooves of the two pipes fit perfectly into each other when the ribbed coupling pipe 42 covers the ribbed connecting pipe 6 and maintains the two parts. The excess of tail part of cable ties 44-1 and 44-2 are directed towards the center of the lid in order not to hinder the movement of the lid 120 on the ground and also to facilitate the installation of the bag 70 (FIG. 13) around the lid 120. It should be noted that the installation and the attachment of the ribbed coupling pipe 42 is the same for all embodiments described herein.

FIG. 13 is a perspective view of the lid 120 with curved edge according to the first embodiment inserted into the debris collection system 2 in its assembled form. The debris collection system 2 includes the suction pipe 4 and the fan outlet 8 of the blower/vacuum 7, the Poly Tubing coupling sleeve 60 with cable ties 58-1 and 58-2, the ribbed connecting pipe 6, the ribbed coupling pipe 42, the cable ties 44-1 and 44-2 around the ribbed coupling pipe 42, the fastener 34 holding the ribbed coupling pipe 42 to the lid, the lid 120 with the two pipes 29 for allowing the air out, the handle 23, the elastic cord 54 and the hooks 56 to hold the bag 70 around the lid 120 and the protective membrane 48. A detailed description of the collection system is presented in the patent application CA 2,748,583 or U.S. Ser. No. 13/539,322.

Figure 14:
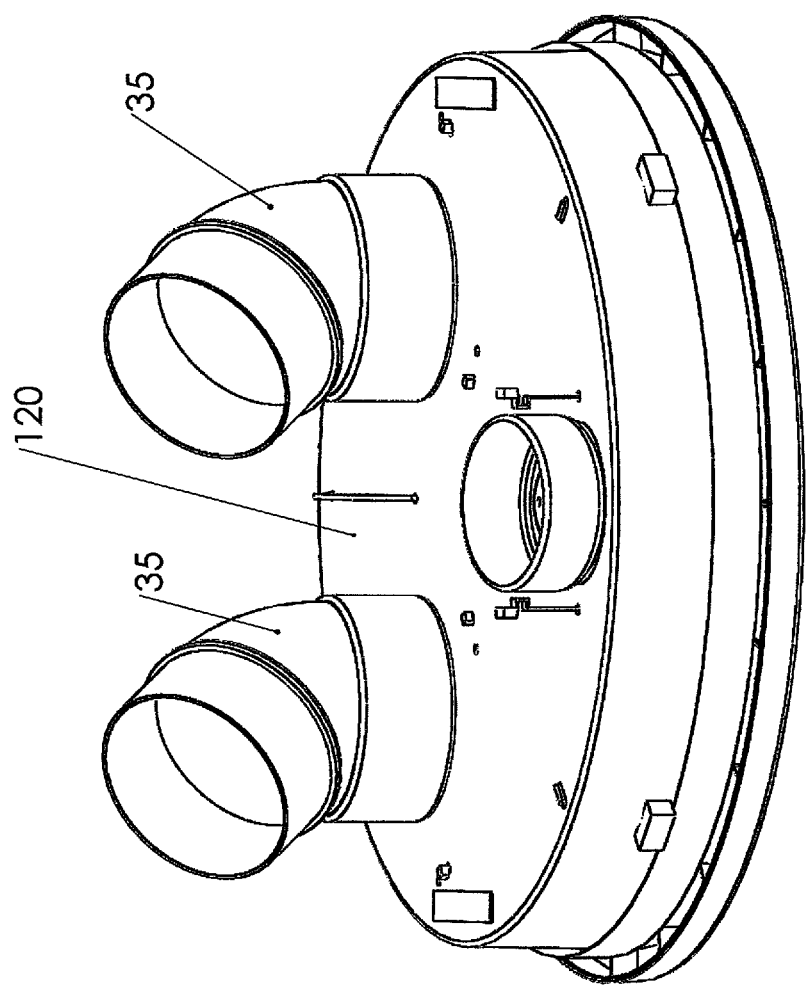
FIG. 14 is a perspective view of the first embodiment with the presence of two 45 degree elbows inserted onto the pipes to the air outlets.

FIG. 14 is a perspective view of the first embodiment of the lid 120 with the presence of two 45 degree elbows 35 placed over the pipe 29 (FIG. 3 and others) to allow the air out. These elbows are used to direct the output of the air towards the ground rather than horizontally. The addition of elbows 35 commercially available for underground drainage is an option to direct the air further away from the operator. The elbows 35 are held in place by the friction exerted between the outer wall of the pipe 29 and the inner wall of the elbow 35. Note that this is the female part of the elbow 35 which is placed on the pipe 29. The orientation of the male parts of the elbows 35 shown in FIG. 14 is here of 45 degrees with respect to the central axis YY' of the lid 120 through the holes 13 and 20 (FIGS. 1 and 2), but it is not limited to that. Other orientations can be chosen as desired by the operator because the elbow 35 can be moved laterally with the hands.

Figure 15:
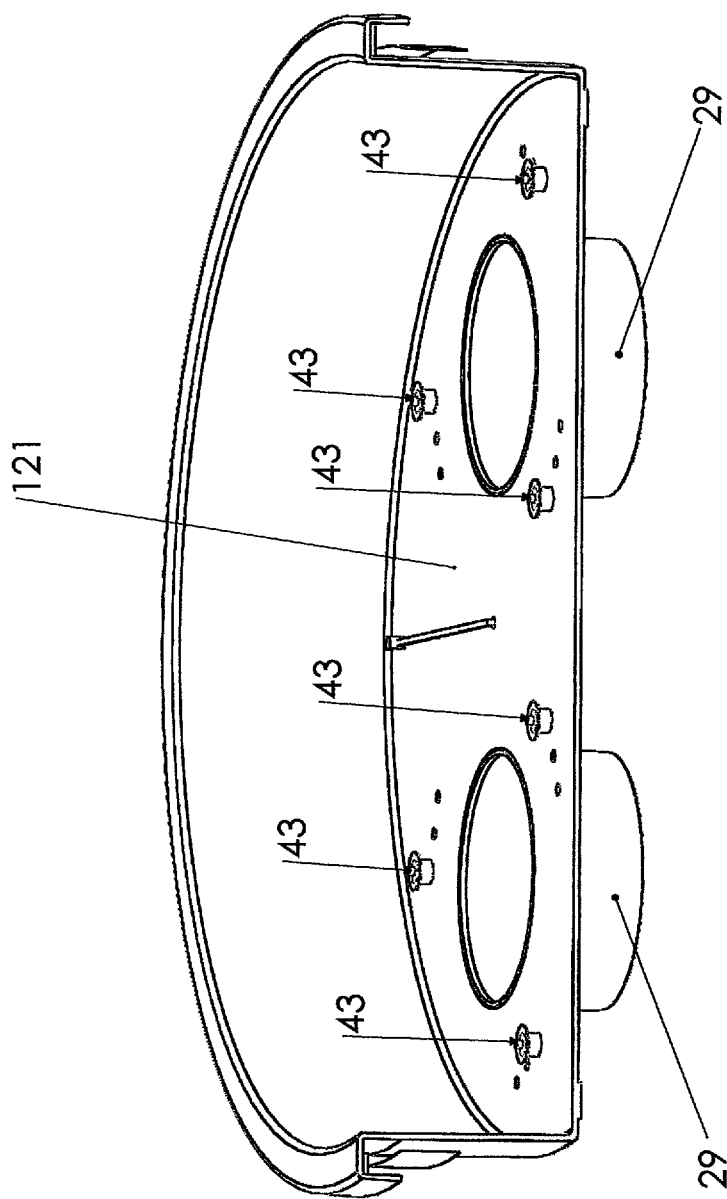
FIG. 15 is a sectional view of the fourth embodiment with the presence of elevations on the underside to hold the strainers.

FIG. 15 is a sectional view of the fourth embodiment of the lid with curved edge. In this embodiment, the lid with curved edge is called lid 121. The lid 121 is similar in every respect to the lid 120 (FIGS. 1 to 14), with the exception that it has elevations on the underside of lid 121 to hold the strainers 40 or 41. The elevations form an integral part of the lid and are molded with the lid close to the holes 12. For the purposes of representation, the elevations are shown with a cylindrical shape in FIG. 15, but this form is not limited to that shape; other shapes may be used such as triangular, rectangular, square and oval. For each strainer, three elevations are arranged on the circumference of a circle whose radius is a few millimeters larger than the radius of the strainer and the center of the circle corresponds to that of pipes 29. The elevations are arranged in an isosceles triangle whose center is the same as that of the opening of pipe 29. The elevations are of the same height as the rigid edge rim of strainers 40 or 41 (FIGS. 4, 10 and others). There are a hole in the center of elevations for screwing a small screw which is placed under a flat hole (round, rectangular, triangular or otherwise) between the top of the elevation and the underside of the screw. In FIG. 12, the part shown is round in shape. Each flat part is bigger than the elevations; the excess part of the piece will cover the edge of strainer 40 or 41 and keep the strainers in place. In this embodiment, the holes 12 serve only to help the air exhaust entering with the debris and thereby reduce the pressure inside the debris collection bag 70 (FIG. 13). This embodiment has the advantage that both types of strainers 40 or 41 can be used and can be installed and removed easily. This embodiment also has an interesting aesthetic.

Figure 16:
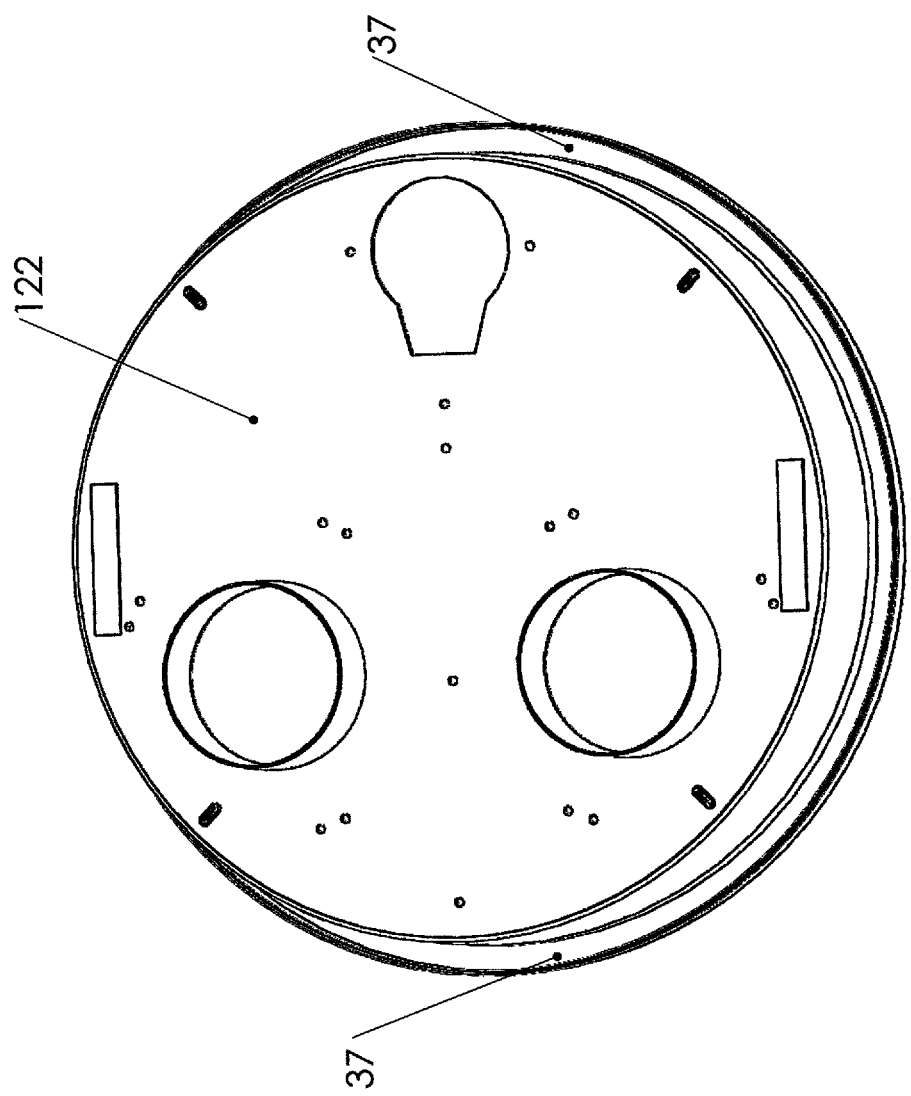
FIG. 16 is a perspective view of the top of the fifth embodiment of the lid with curved edge without the reinforcement inside the curved edge.

FIG. 16 is a perspective view of the top of the fifth embodiment of the lid with curved edge. In this embodiment, the lid with curved edge is called lid 122. The lid 122 is similar in every respect to the lid 120 (FIGS. 1 to 14), with the exception that it does not have reinforcements 31 (FIGS. 1 to 14) in the U-shaped groove of the curved edge 37. The reason for the lid 122 is the lowest cost for manufacturing of injection mold for molding the lid 122. However, this structure, although less rigid than that of the lid 120 (FIGS. 1 to 14) has sufficient rigidity for use in the debris collection system 2 (FIG. 13). It should also be considered that the curved edge of the lid 122 without reinforcement can also be used with lids 121 (FIG. 15) and 123 (FIGS. 17 and 18).

Figure 17:
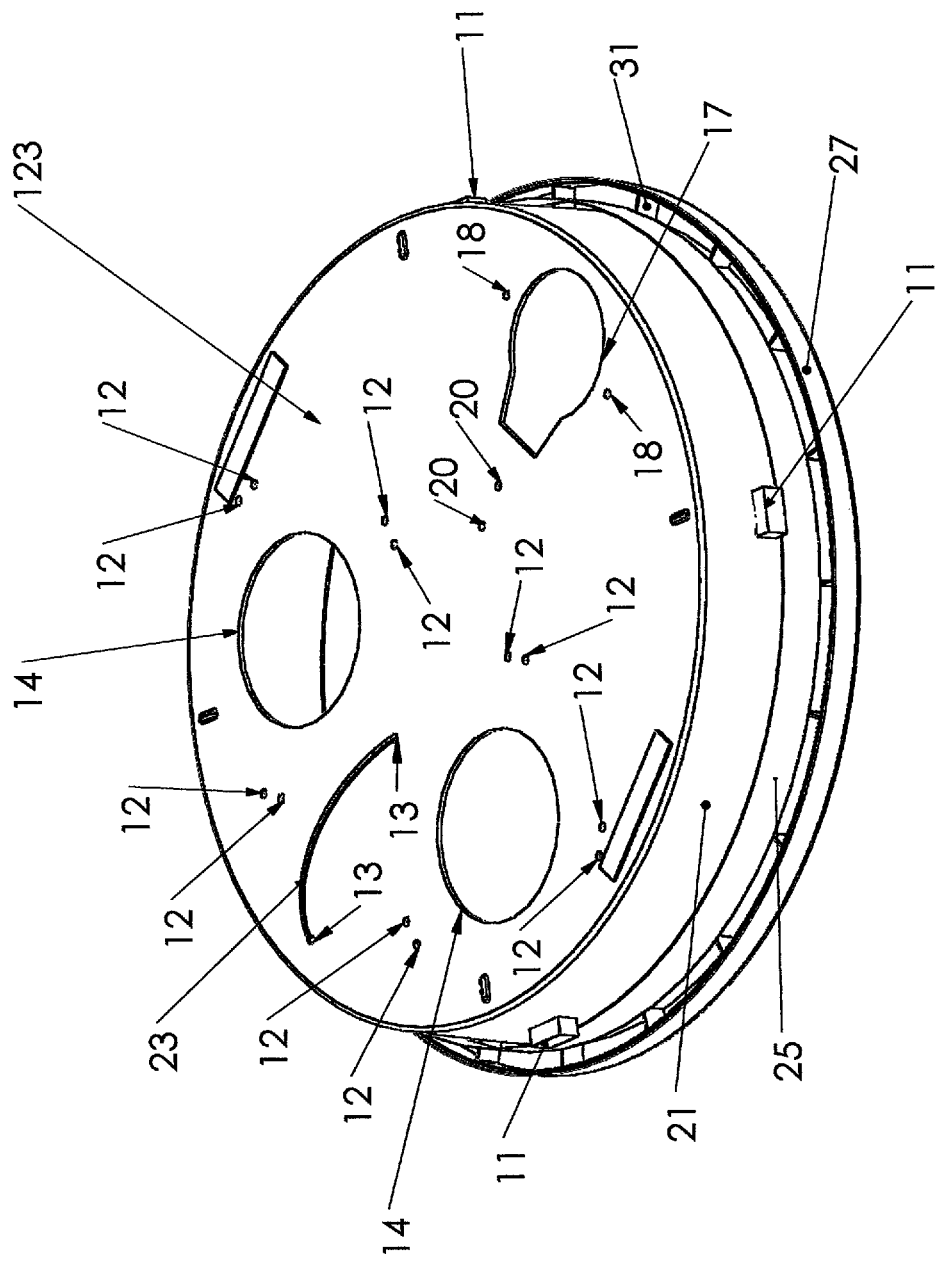
FIG. 17 is a perspective view of the top of the sixth embodiment of the lid with curved edge with two openings without pipe for air outlets.
Figure 18:
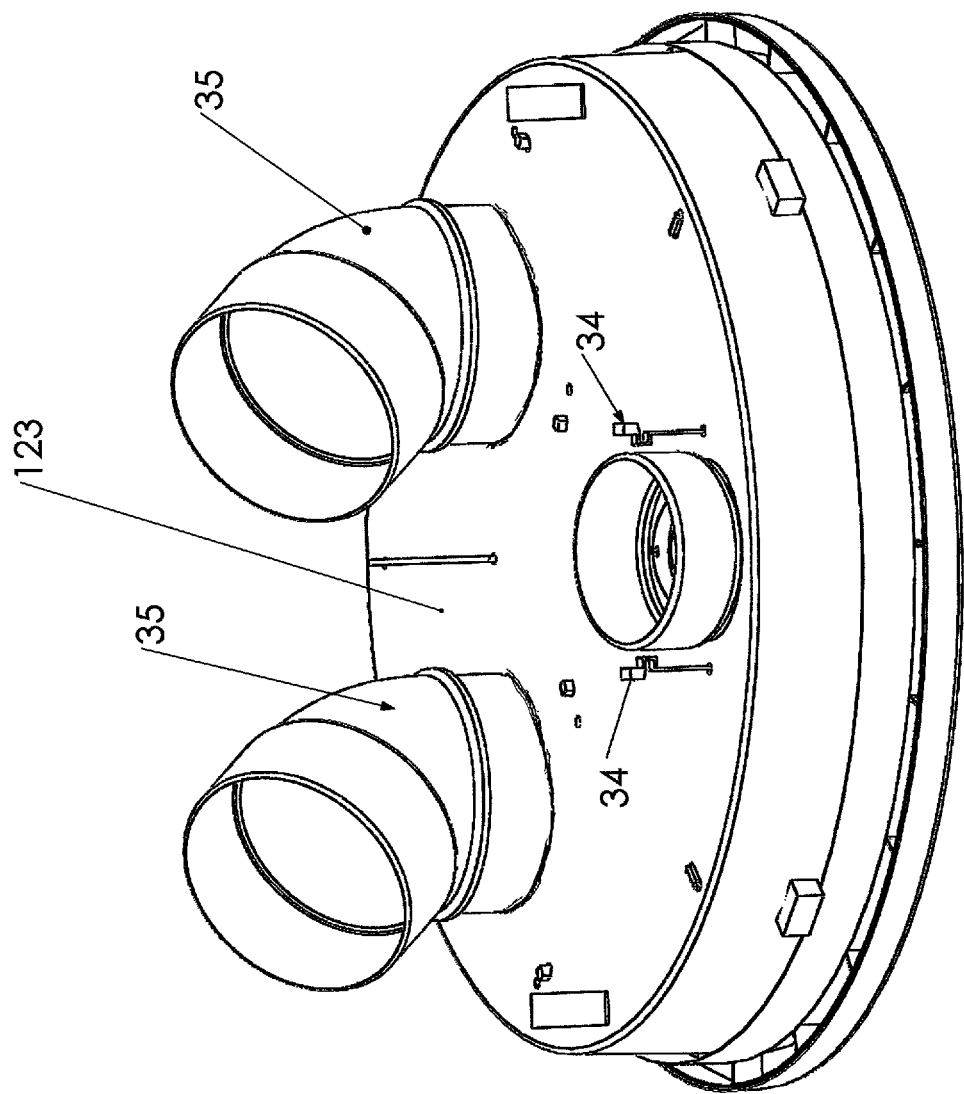
FIG. 18 is a perspective view of the top of the sixth embodiment of the lid with curved edge with the presence of two 45 degree elbows inserted into the two openings for the air outlet.

FIGS. 17 and 18 are perspective views of the top of the sixth embodiment of the lid with curved edge. In this embodiment, the lid with curved edge is called lid 123. The lid 123 is similar in every respect to the lid 120 (FIGS. 1 to 14), with the exception that it has no pipe 29 for allowing the air out, but only two openings 14 of the same size. The lid 123 has twelve holes 12 for the insertion of cable ties for holding the strainers, two holes 20 for the cable tie which will attach the elbow 32 (FIG. 5) to the lid 123, two holes 18 for fasteners 34 (FIG. 18) that retain the ribbed coupling pipe 42 (FIGS. 12 and 13), two holes 13 for installing the handle 23, the slightly flared wall 21 of the lid 123, four elevations 11, the anti-skid tape 25 on 360 and the curved edge 27 with the reinforcements 31. The reason of the lid 123 is the lowest cost of manufacture of injection mold for molding the lid. However, for directing air, it is necessary to add, in each opening 14, an elbow 35 (FIG. 18) to direct air away from the operator. In this embodiment, the male part of the elbow 35 is partially inserted into the opening 14. The elbow 35 is held in place by friction between the wall of the opening 14 of the lid 123 and the outer wall of the male part of the elbow 35. The diameter of the opening 14 being slightly smaller than the outer diameter of the male part of the elbow 35, the opening 14 is slightly deformed when inserting the elbow 35. The orientation of the female parts of the elbow 35 shown in FIG. 18 is here of 45 degrees from the central axis YY' of the lid 123 passing through the holes 13 and 20 (FIG. 17), but the orientation is not limited to 45 degrees. Other orientations can be used as desired by the operator because the elbow 35 can be moved laterally with the hands.

Figure 19:
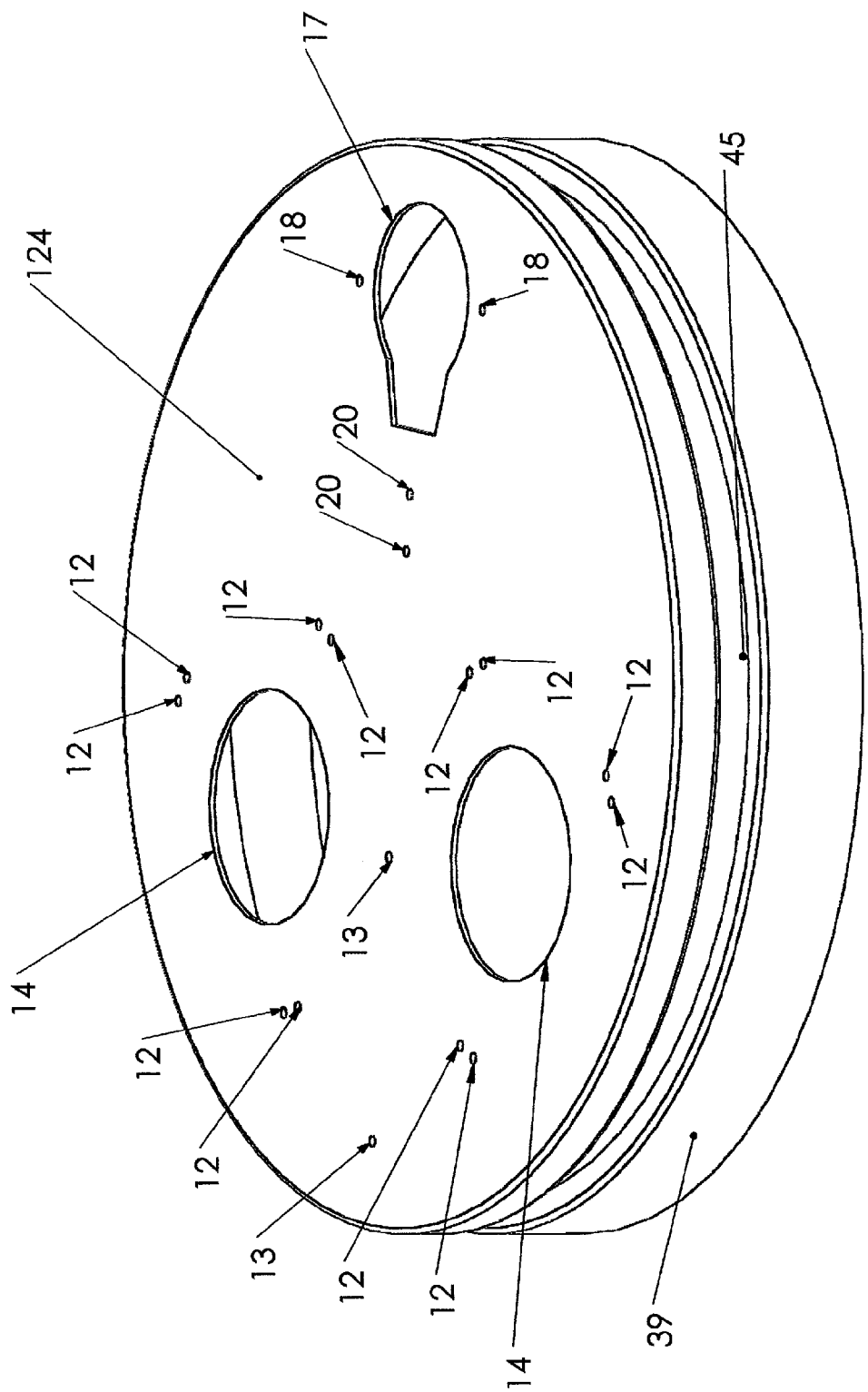
FIG. 19 is a perspective view of a seventh embodiment which uses a lid with an incised groove on the side wall.

FIG. 19 is a perspective view of the seventh embodiment which uses a lid 124 with a groove incised on the side wall. The lid 124 has the same characteristic as the lid 123 (FIGS. 17 and 18) for holes 12, 13, 18 and 20 and openings 14 and 17. However, the lid 124 differs in respect to the sidewall 39. Indeed, it has a lateral groove 45 through 360 degrees. The side wall 39 is circular and the same size over 360 degrees. The creation of the partly round opening 17 with a flared U-shaped extension on top of the lid 124 allows one to direct the outlet of the elbow 32 (FIG. 5) to the underside of the lid 124 and inside the wall 39. The lid 124 is different from the lid 10 described in the patent application CA 2,748,583 (U.S. Ser. No. 13/539,322) in that the side wall 39 is uniform over 360 degrees, that the width of the side wall 39 is smaller and the lateral groove 45 is of a different shape. This grooved shape is easier to mold by the usual techniques other than by injection.

Figure 20:
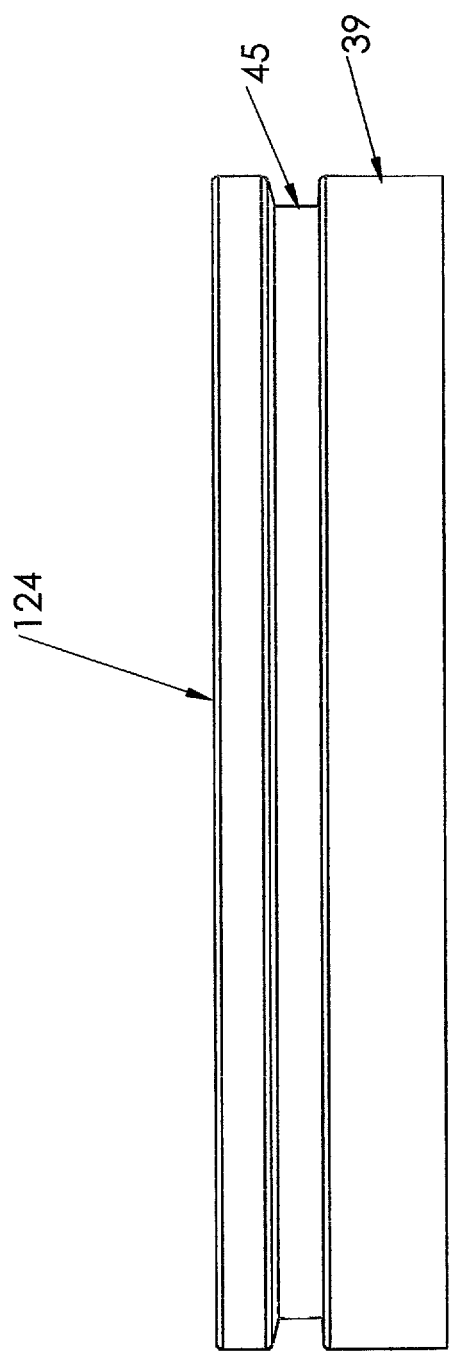
FIG. 20 is a side view of the seventh embodiment, showing in particular the shape of the 360 degree lateral groove.

FIG. 20 is a side view of the seventh embodiment, showing in particular the lid 124 with the shape of the side groove 45 through 360 degrees. In this embodiment, the groove 45 is U-shaped with flat bottom and with one side flared outward and the other is perpendicular to the flat bottom. The side flare is near the top of the lid 124. At the bottom of the groove, an anti-skid tape will be pasted over 360 degrees to increase friction between the debris collection bag 70 (FIG. 13) and the bottom of the groove 45 on wall 39.

Operation of the Debris Collection System

To use the debris collection system 2 of the present invention, the operator must first install the various components of lid 120. The operator must first put on the wall 21 of lid 120, below the curved edge 27, the adhesive anti-skid tape 25 and then the four elevations 11 near the edge of the latter in places indicated by the protrusions 9. Thereafter, the operator then proceeds to attach the two strainers 41 or 40 on the underside of the lid using the six flexible fasteners 19 or 38 (only strainer 40). To do this, the operator positions the rigid edge of each of the strainers 41 on the underside of the lid 120. For each of the strainers the operator inserts, through the top of the lid, the tail part of three fasteners 19 in three holes 12 distributed so that all three form an isosceles triangle. The second part of a self-locking fastener is then inserted into the tail part of the first cable tie (which is below the lid) to the edge of the strainers 41 or 40. For strainers 40, the operator places each of the three ears on the rigid edge between the groups of two holes 12 made side by side in a concentric circle with the pipes 29. The strainers 40 are then attached by passing the cable ties 38 through the two holes of each side of the ear and closing the cable ties over the ears of different strainers 40. At the next step, the operator inserts the male section of the elbow 30 into the opening 17, through the top of lid 120, up to the shoulder of the elbow (beginning of the female section). Then, by the underside of the lid 120, the operator inserts the female part of the elbow 32 into the male section of the elbow 30 so that the two elbows 30 and 32 form an angle of 90 degrees. The connection of the two elbows is made on both sides of the top and the underside of the lid 120, which retains them partially to the lid. The male section of the elbow 32 is oriented between the two strainers in the direction of the holes 20 in the lid 120. The elbow 32 is attached with the cable tie 36 passing through the two holes 20 in the lid 120 and by closing the cable tie through the hole in the male part of the elbow 32. This ensures directional stability of both elbows to the entry of debris and air. The operator then proceeds with the installation of the ribbed coupling pipe 42 on the female section of the elbow 30. To do this, one opens the ribbed coupling pipe 42 slightly and one places it over the female section of the elbow 30. Through the exterior face of the lid 120, the operator inserts the tail part of the two fasteners 34 in the openings 18 of the lid 120 so that the head of each cable tie is a few centimeters above the lid 120. The cable tie 44-1 is then placed over the two fasteners 34 while passing under the heads of the fasteners 34. The cable tie 44-1 is then tightened against the ribbed coupling pipe 42, which bends the fasteners 34 to fit the groove of the ribbed coupling pipe 42 and at the same time adjusts the ribbed coupling pipe 42 to the female section of the elbow 30. Finally, the operator inserts another cable tie, similar to the first part of the cable tie inside the lid 120, on the part of the fasteners 34 already inserted. One proceeds in the same manner for the second fasteners 34. The excess of cable ties are removed so that they don't obstruct. The operator then installs the membrane 48 by inserting the ribbed coupling pipe 42 into the opening on the front part of the membrane 48. The membrane 48 will be perpendicular to lid 120 and under the bag 70 during operation of the debris collection system 2. Then the operator inserts the ribbed connecting pipe 6 into the ribbed coupling pipe 42. The ribbed connecting pipe 6 is inserted up to the female part of the elbow 30 so that the grooves and curves of the ribbed coupling pipe 42 and the ribbed connecting pipe 6 are superimposed one over the other, both being made of the same type of ribbed pipe. The cable tie 44-2 is placed in a groove of the ribbed coupling pipe 42, near the end and surrounds the said ribbed coupling pipe 42. The cable tie 44-2 is then tightened strongly against the ribbed coupling pipe 42 which compresses the inside of the ribbed coupling pipe 42 onto the outside of the ribbed connecting pipe 6 and thus prevents the longitudinal movement, but allows the rotational movement of the ribbed connecting pipe 6 within the ribbed coupling pipe 42. This rotational movement allows for the adjustment of the position of the lid to the ground as well as the fan outlet 8 of the blower/vacuum 7 when the operator is moving or when replacing the bag 70. The next step consists in the insertion of the ribbed connecting pipe 6 and the fan outlet 8 into the Poly Tubing coupling sleeve 60; the fan outlet 8 also enters into the ribbed connecting pipe 6 for a better hold. The two cable ties 58-1 and 58-2 are then placed around the Poly Tubing coupling sleeve 60 near the ends. Both cable ties are then tightened around the Poly Tubing coupling sleeve 60 to seal the joint and to hold the ribbed connecting pipe 6 to the fan outlet 8 of the blower/vacuum 7. The cable tie 58-2 on the fan outlet 8 is placed behind the bulge of the fan outlet 8 of the blower/vacuum 7. The final steps are to insert the lateral part of the lid 120 into the opening of bag 70 to collect the debris and then to put the elastic cord 54 over the bag between curved edge 27 and the elevation 11 of lid 120. The two hooks 56 of the elastic cord 54 are used to connect the two ends and to keep the tension on the walls of the bag 70. In this position, the top of the lid 120 is perpendicular to the walls of bag 70. When the next option is used, the operator installs over the pipes 29 the female part of the two 45 degree elbows 35 that will direct the air outlet toward the ground instead of horizontally. The operator directs the male part of the elbow to the ground at the desired angle.

Next, the operator activates the blower/vacuum 7 and proceeds with the vacuuming up of debris. The debris and the air sucked up are thrown out by the fan outlet 8 of the blower/vacuum 7 into the ribbed connecting pipe 6 and then into the lid 120 between the two strainers 41 or 40, up to the wall of the lid 120. From there, the debris is deflected laterally towards the bottom of the bag 70 for collection of the debris while the air flow brought in passes through the strainers 40 or 41 (as applicable) and goes out of the bag 70. The fast air flow between the two strainers 40 or 41 has the effect of preventing the debris from adhering sufficiently to the domed surface of the strainers to negatively affect the air outlet. When the bag 70 begins to fill up, the operator lifts the lid 120 by using the handle 23 or stops the blower/vacuum 7 and compresses the debris by pressing the side of the bag 70 in order to put in more debris. The Operator restarts the blower/vacuum 7 and continues collecting debris.

The operator can move around the field by dragging the bag on the ground without having to carry the weight of the debris. The membrane 48 below the bag protects and facilitates the sliding of the bag 70 on the ground. When the bag 70 is full, the operator stops the blower/vacuum 7, loosens the elastic cord 54 around the lid 120 to remove the tension on the bag 70, frees the bag 70 from the lid 120 and slightly compresses the top of the bag 70 in order to have enough space to close the opening of the bag 70 with a tie or a knot. The debris remains in the collection bag 70 without having to pour it into another bag. The operator places a new bag 70 on the lid 120, installs the elastic cord 54, restarts the blower/vacuum 7 and can proceed rapidly to the work of collecting debris.

All kinds of bags can be used provided they are large enough to insert the lid 120 in the opening of bag 70. The type of bag can be sealed or not, paper or other material.

To store the blower/vacuum, the cable tie 58-2 which goes around the fan outlet 8 is removed and the cable tie 44-2 surrounding the ribbed coupling pipe 42, which allows one to disconnect the ribbed connecting pipe 6 of the blower/vacuum 7 and lid 120. The debris collection system can then be stored in three parts, namely blower/vacuum 7, ribbed connecting pipe 6 and lid 120 with its various components.

Cable ties 58-2 and 44-2 can be provided with a release mechanism and are reusable or disposable, they must then be cut to be removed. These inexpensive cable ties are sold commercially and can be easily replaced by the operator.

Depending on the type of lid, the following differences apply:

For the lid 121, the strainers 40 or 41 are attached to the lid by placing the flat parts with a hole on the elevation 43 and screwing the small screw holes in the center of the elevations.

For the lid 122, the procedure is exactly the same as for the lid 120.

For the lid 123, it is necessary to insert the male part of the two 45 degree elbows 35 into the openings 14; that will allow to direct the air outlet toward the ground instead of horizontally and guiding the female part of elbows 35 to the ground to the desired angle.

For the lid 124, with a lateral groove, the anti-skid tape shall be installed in the groove 45. It is also necessary to insert the male part of the two 45 degree elbows 35 into the openings 14; that will allow to direct the air outlet toward the ground instead of horizontally and direct the female part of the elbows 35 toward the ground at the desired angle.

We claim:

1. A lid with air outlet openings for leaves collection with a portable blower/vacuum and the rejection of debris in a bag, the lid is round shape with a flat or domed top with a lateral side with a curved 360-degree U-shaped edge which comprises:
    a) reinforcements in the curved edge; b) a rough anti-skid tape; c) elevations on the lateral side of the lid; d) two pipes for the air outlet and an opening to allow debris in; e) two elbows to allow debris in; f) two strainers for air filtration and retention of debris; g) holes on the top of the lid to attach the two elbows, the two strainers, a ribbed coupling pipe and a handle to the lid with flexible plastic cable ties.

2. The lid of claim 1 wherein there is a curved 360-degree U-shaped edge that is formed by the lateral side of the lid and by the curvature of the extension of the wall folded towards the outside of the lid.

3. The lid of claim 2, wherein the edge curved in a U-shape has, at regular intervals, the side reinforcements to give more rigidity to the lid.

4. The lid of claim 1, wherein the lateral side is slightly flared toward the outside of the lid relative to the top of the lid.

5. The lid of claim 1, wherein the rough anti-skid tape is glued to the lateral side at the lower end of the curved edge on 360 degrees.

6. The lid of claim 1, wherein the elevations on the lateral side are made of felt or plastic or rubber and with an adhesive film underneath or utility hooks.

7. The lid of claim 6, wherein the elevations are in number of four on the lateral side, which are arranged at equal distances and at an angle of 45 degrees on either side of a central axis YY' passing through the center of the lid and the center of the opening to allow debris in, the central axis YY' being perpendicular to a central axis XX' also passing through the center of the lid.

8. The lid of claim 7, wherein the elevations are placed near the edge of the rough anti-skid tape on the side opposite to the curved edge of the lid.

9. The lid of claim 6, wherein the utility hooks have a flat base and are placed on the lateral side of the lid perpendicular to the curved edge of the lid.

10. The lid of claim 9, wherein the rough anti-skid tape is glued onto the lateral side at the lower end of the curved edge over 360 degrees and above the base of the hooks.

11. The lid of claim 1, wherein the two pipes for air outlet are an integral part of the lid having been molded with the lid.

12. The lid of claim 11, wherein the two pipes for air outlet are equidistant from a central axis YY' and a central axis XX', and of which the central axis YY' passes through the center of the lid and the center of the opening to allow debris in and is perpendicular to the central axis XX' also passing through the center of the lid.

13. The lid of claim 1, wherein the opening to allow debris in is partly round with a U-shaped, flared extension wherein the base is directed towards the center of the lid.

14. The lid of claim 1, wherein the two 45 degree elbows have a male part and a female part and of which the two elbows are inserted into the opening for the entrance of debris, on both sides of the lid, so as to form an angle of 90 degrees when inserted one in the other.

15. The lid of claim 14, wherein the female part of an elbow rests on top of the lid and the male part is below the lid.

16. The lid of claim 14, wherein the female part is bigger than the male part.

17. The lid of claim 14, wherein the two elbows forming an angle of 90 degrees are inclined at an angle of about 10 degrees relative to the top of the lid.

18. The lid of claim 1, wherein there are 18 small holes on top of the lid, of which 12 are placed at the periphery of the two strainers so as to form an isosceles triangle, four are placed on a central axis YY' passing through the center of the lid and the center of the opening for the entrance of debris and which is perpendicular at a central axis XX' also passing through the center of the lid, and of which two are placed on each side of the opening for the entrance of debris on an axis which passes through the center of the round part of the opening for the entrance of debris and which is perpendicular to the central axis YY'.

19. The lid of claim 18, wherein the six holes at the periphery of a strainer are placed in three groups of two on a circle whose center corresponds to the middle of the openings of the pipes for the air outlet.

20. The lid of claim 19, wherein the holes on the periphery of the strainers are used to attach the strainers to the underside of lid with the flexible plastic cable ties.

21. The lid of claim 19, wherein the holes in the lid located on the circumference of the edge of the strainers to retain them to the lid are used to install a cable tie, a screw with a nut or only a screw with a nut and washer using the said holes in the lid to attach the strainers.

22. The lid of claim 18, wherein two holes are sufficiently spaced along the central axis YY' to be connected by a flexible cable tie or a rope or a fixed handle so as to form the handle on top of the lid when the two holes are joined.

23. The lid of claim 22, wherein the two holes on the central axis YY' used in the manufacture of a handle are located between the center of the two pipes for the air outlet and the edge of the lid.

24. The lid of claim 18, wherein two holes on the central axis YY' used to attach on the top of the lid, with a flexible plastic cable tie, the male part of an elbow for the entrance of debris.

25. The lid of claim 1, wherein the use of earless strainers on their edge, the said strainers being centered relative to the pipes for the air outlet.

26. The lid of claim 1, wherein the flexible plastic cable ties have a tie part and an interlocking part and of which two flexible plastic cable ties one into the other form a small hook to retain the strainers attached to the lid.

27. The lid of claim 26, wherein a cable tie is inserted into one of the holes on the top of the lid so that the interlocking part of the cable tie is larger than the opening of the hole and serves as an anchor point for a second cable tie that is attached on its lower tail part.

28. The lid of claim 27, wherein the portion of the cable tie in the tail part of the cable tie anchor rests in part over the edge of the strainer to maintain it.

29. The lid of claim 1, wherein the arrangement of three cables ties that anchor and hold that are placed around the edge of each of the strainers.

30. The lid of claim 1, wherein two openings for the air outlet pipes are each covered on the underside of the lid by the strainers for air filtration and retention of debris.

31. The lid of claim 30, wherein the strainers have a domed surface.

32. The lid of claim 30, wherein the rigid edge of the strainer rests on the underside of the lid and wherein the strainer is centered relative to the pipe for the air outlet.

33. The lid of claim 32, wherein the strainers are attached by the rigid edge to the lid with cable ties, or screws with nuts and washers which pass through holes in the lid located near the outer rigid edge of the strainers.

34. The lid of claim 1, wherein the use of strainers with ears of which the number of ears on the rigid edge of each strainer is three.

35. The lid of claim 34, wherein the strainers are attached by the ears on the underside of the lid with the flexible plastic cable ties passing through the holes in the top of the lid.

36. The lid of claim 1, wherein a debris collection bag made of plastic, paper, fabric or other materials wherein the opening is placed around the lateral side and wherein an elastic cord is placed over the wall of the debris collection bag between the curved edge of the lid and the elevations glued to the lateral side of the lid.

37. The lid of claim 36, including the elastic cord is placed over the anti-skid tape over 360 degrees.

38. The lid of claim 1, wherein the name WILDENLAL is inscribed on top of the lid near the curved edge.

39. A lid with air outlet openings for leaves collection with a portable blower/vacuum and the rejection of debris in a bag, the lid is round shape with a flat or domed top with a lateral side with a curved 360-degree U-shaped edge which comprises: a) reinforcements in the curved edge; b) a rough anti-skid tape; c) elevations on the lateral side of the lid; d) two pipes for the air outlet and an opening to allow debris in; e) two elbows to allow debris in; f) two strainers for air filtration and retention of debris; g) holes on the top of the lid to attach the two elbows, the two strainers, a ribbed coupling pipe and a handle to the lid with flexible plastic cable ties; h) elevations under the lid to attach the strainers.

40. The lid of claim 39, wherein six elevations are molded on the underside of the lid at the outer periphery of the circle where will be set each of the two strainers.

41. The lid of claim 40, wherein the number of elevations is three for each strainer, which are arranged in an isosceles triangle around the rim of each strainer.

42. The lid of claim 40, wherein each elevation has a hole for screwing a small screw that will hold a perforated piece, flat and round, rectangular, square or triangular between the top of the elevation and the head of the screw.

43. The lid of claim 42, wherein the size of the flat piece exceeding the elevation so as to cover the edge of the strainer.

44. A lid with air outlet openings for leaves collection with a portable blower/vacuum and the rejection of debris in a bag, the lid is round shape with a flat or domed top with a lateral side with a curved 360-degree U-shaped edge which comprises: a) a rough anti-skid tape; b) elevations on the lateral side of the lid; c) two pipes for the air outlet and an opening for the entrance of debris; d) two elbows to allow debris in; e) two strainers for air filtration and retention of debris; f) holes on the top of the lid to attach the two elbows, the two strainers, a ribbed coupling pipe and a handle to the lid with flexible plastic cable ties.

\* \* \* \* \*